United States Patent
Bi et al.

(10) Patent No.: US 11,496,985 B2
(45) Date of Patent: Nov. 8, 2022

(54) METHOD FOR DETERMINING TIME DIFFERENCE OF ARRIVAL, AND COMMUNICATION DEVICE AND SYSTEM

(71) Applicant: ZTE Corporation, Shenzhen (CN)

(72) Inventors: Cheng Bi, Shenzhen (CN); Shijun Chen, Shenzhen (CN); Yuanyuan Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/266,224

(22) PCT Filed: Sep. 17, 2018

(86) PCT No.: PCT/CN2018/106036
§ 371 (c)(1),
(2) Date: Feb. 5, 2021

(87) PCT Pub. No.: WO2020/034297
PCT Pub. Date: Feb. 20, 2020

(65) Prior Publication Data
US 2021/0314902 A1    Oct. 7, 2021

(30) Foreign Application Priority Data
Aug. 13, 2018  (CN) .......................... 201810917984.8

(51) Int. Cl.
*H04W 64/00*    (2009.01)

(52) U.S. Cl.
CPC ................................. *H04W 64/00* (2013.01)

(58) Field of Classification Search
CPC .................................................... H04W 64/00
See application file for complete search history.

(56) References Cited

U.S. PATENT DOCUMENTS

| 2017/0156108 A1 | 6/2017 | Kim |
| 2018/0109302 A1 | 4/2018 | Nagaraja |

FOREIGN PATENT DOCUMENTS

| CN | 102595450 A | 7/2012 |
| CN | 103068012 A | 4/2013 |
| CN | 103209475 A | 7/2013 |
| CN | 104380140 A | 2/2015 |

(Continued)

OTHER PUBLICATIONS

3GPP Technical Specification Group Radio Access Network NG Radio Access Netwrok NG-RAN, "Stage 2 functional specification of User Equipment (UE) Positioning in NG-RAN (Release 15)", 3GPP TS 38.305 V2.0.0, Jun. 30, 2018.

(Continued)

*Primary Examiner* — Curtis B Odom
(74) *Attorney, Agent, or Firm* — Cantor Colburn LLP

(57) ABSTRACT

A method for determining a time difference of arrival, and a communication device and system, where neighbor cells for positioning are determined for a target terminal by a positioning server, then cell identities of the neighbor cells and beam polling configuration information of the neighbor cells are transmitted to the target terminal, so that the target terminal may detect a Positioning Reference Signal (PRS) beam transmitted by a corresponding neighbor cell according to the beam polling configuration information, and a time difference of arrival of PRS beams transmitted by one neighbor cell and another neighbor cell is calculated.

20 Claims, 6 Drawing Sheets

---

A cell transmits beam polling configuration information of the cell to a positioning server — S402

↓

The cell transmits a PRS beam according to the beam polling configuration information — S404

(56) References Cited

FOREIGN PATENT DOCUMENTS

CN          108093360 A      5/2018
WO       2017164924 A1     11/2017

OTHER PUBLICATIONS

International Search Report for corresponding application PCT/CN2018/106036 filed Sep. 17, 2018; dated Apr. 24, 2019.
European Search Report for corresponding application EP 18 93 0243; Report dated Sep. 24, 2021.

METHOD FOR DETERMINING TIME DIFFERENCE OF ARRIVAL, AND COMMUNICATION DEVICE AND SYSTEM

CROSS REFERENCE

This application is a National Stage Filing of the PCT International Application No. PCT/CN2018/106036 filed on Sep. 17, 2018, which claims priority to Chinese Application No. 201810917984.8 filed on Aug. 13, 2018, the entirety of which is herein incorporated by reference.

TECHNICAL FIELD

The present disclosure relates to the field of positioning, and more particularly, to a method determining Time Difference Of Arrival (TDOA), and a communication device and system.

BACKGROUND

A Long Term Evolution (LTE) system introduces support for positioning since release 9, and a Positioning Reference Signal (PRS) is also introduced to achieve downlink positioning. In the LTE system, the PRS used for measurement is usually transmitted in the form of a broadcast, and a positioning server or a receiving node determines the position of the receiving node according to a measurement result at the receiving node.

In a 5th generation mobile networks (5G) system, a millimeter wave communication technology will be widely used in order to achieve higher data transmission rate. Millimeter waves refer to electromagnetic waves having a wavelength on the order of millimeters and having a frequency between about 30 GHz and 300 GHz. One characteristic of a millimeter wave band is that the attenuation is serious in the air, the diffraction ability is weak, and the atmospheric and rainwater absorption influence is great, so that a downlink positioning scheme in the LTE system is no longer applicable to the 5G system. Therefore, it is necessary to provide a positioning scheme that may be applied in a millimeter wave communication scenario.

SUMMARY

The embodiments of the present disclosure provide a method for determining a time difference of arrival, and a communication device and system, which solve the technical problem that a terminal cannot be accurately positioned in a 5G system by providing a time difference of arrival determination scheme applicable to millimeter waves.

The embodiments of the present disclosure provide a method for determining a time difference of arrival, which may include the following operations.

Neighbor cells for positioning are determined for a terminal.

Cell identities and beam polling configuration information of the neighbor cells are transmitted to the terminal. In the embodiments, the cell identities and the beam polling configuration information are used for the terminal to detect PRS beams transmitted by the neighbor cells and to determine, according to a detection result, a time difference of arrival of PRS beams transmitted by one neighbor cell and another neighbor cell.

The embodiments of the present disclosure also provide a method for determining a time difference of arrival, which may include the following operations.

Cell identities and beam polling configuration information of positioning cells, which are transmitted by a positioning server, are received.

PRS beams transmitted by the positioning cells are detected according to the cell identities and the beam polling configuration information, and detection moments of the PRS beams are determined. In the embodiments, each PRS beam carries transmission moment information indicating a transmission moment of the PRS beam.

A time difference of arrival of the PSR beams transmitted by two positioning cells is determined according to the transmission moments and the detection moments of the PRS beams transmitted by the two positioning cells.

The embodiments of the present disclosure also provide a method for determining a time difference of arrival, which includes the following operations.

Beam polling configuration information of a cell is transmitted to a positioning server. In the embodiments, the beam polling configuration information is used for detecting a PRS beam by a terminal to be positioned after receiving the beam polling configuration information transmitted by the positioning server.

The PRS beam is transmitted according to the beam polling configuration information. In the embodiments, the PRS beam carries transmission moment information indicating a transmission moment of the PRS beam, and the transmission moment is used for the terminal to determine, by combining a detection moment of the PRS beam, a time difference of arrival of PRS beams transmitted by the cell and another positioning cell.

The embodiments of the present disclosure also provide an apparatus for determining a time difference of arrival, which may include a cell determination module and an information transmission module.

The cell determination module is configured to determine, for a terminal, neighbor cells for positioning.

The information transmission module is configured to transmit cell identities and beam polling configuration information of the neighbor cells to the terminal. In the embodiments, the cell identities and the beam polling configuration information are used for the terminal to detect PRS beams transmitted by the neighbor cells and to determine, according to a detection result, a time difference of arrival of PRS beams transmitted by one neighbor cell and another neighbor cell.

The embodiments of the present disclosure also provide an apparatus for determining a time difference of arrival, which includes an information receiving module, a beam detection module and a time difference of arrival determination module.

The information receiving module is configured to receive cell identities and beam polling configuration information of positioning cells, which are transmitted by a positioning server.

The beam detection module is configured to detect, according to the cell identities and the beam polling configuration information, PRS beams transmitted by the positioning cells, and determine detection moments of the PRS beams. In the embodiments, each PRS beam carries transmission moment information indicating a transmission moment of the PRS beam.

The time difference of arrival determination module is configured to determine, according to the transmission moments and the detection moments of the PRS beams transmitted by the two positioning cells, a time difference of arrival of the PSR beams transmitted by two positioning cells.

The embodiments of the present disclosure also provide an apparatus for determining a time difference of arrival, which includes a configuration information transmission module and a beam transmission module.

The configuration information transmission module is configured to transmit beam polling configuration information of a cell to a positioning server. In the embodiments, the beam polling configuration information is used for detecting a PRS beam by a terminal to be positioned after receiving the beam polling configuration information transmitted by the positioning server.

The beam transmission module is configured to transmit a PRS beam according to the beam polling configuration information. In the embodiments, the PRS beam carries transmission moment information indicating a transmission moment of the PRS beam, and the transmission moment is used for the terminal to determine, by combining a detection moment of the PRS beam, a time difference of arrival of PRS beams transmitted by the cell and another positioning cell.

The embodiments of the present disclosure also provide a communication device, which may include a processor, a memory and a communication bus.

The communication bus is configured to implement a connection and communication between the processor and the memory.

The processor is configured to execute a first time difference of arrival determination program stored in the memory to implement the operations of the method for determining the time difference of arrival on a positioning base station side. Alternatively, the processor is configured to execute a second time difference of arrival determination program stored in the memory to implement the operations of the method for determining the time difference of arrival on a terminal side. Alternatively, the processor is configured to execute a first time difference of arrival determination program stored in the memory to implement the operations of the method for determining the time difference of arrival from the perspective of a cell.

The embodiments of the present disclosure also provide a communication system, which may include a terminal, a positioning server and multiple transmission nodes. The terminal, the positioning server and the transmission nodes are in mutual communication.

The terminal is the communication device in which the processor executes the second time difference of arrival determination program to implement the operations of the method for determining the time difference of arrival from the perspective of a terminal. The positioning server is the communication device in which the processor executes the first time difference of arrival determination program to implement the operations of the method for determining the time difference of arrival from the perspective of a positioning server. The transmission node is the communication device in which the processor executes the third time difference of arrival determination program to implement the operations of the method for determining the time difference of arrival from the perspective of a cell.

The embodiments of the present disclosure also provide a storage medium, which may store at least one of a first time difference of arrival determination program, a second time difference of arrival determination program and a third time difference of arrival determination program. The first time difference of arrival determination program may be executed by one or more processors to implement the operations of the method for determining the time difference of arrival from the perspective of a positioning server. The second time difference of arrival determination program may be executed by one or more processors to implement the operations of the method for determining the time difference of arrival from the perspective of a terminal. The third time difference of arrival determination program may be executed by one or more processors to implement the operations of the method for determining the time difference of arrival from the perspective of a cell.

DETAILED DESCRIPTION OF THE EMBODIMENTS

In order to make the purposes, technical solutions and advantages of the present disclosure clearer, the embodiments of the present disclosure will be further described in detail below with reference to exemplary implementation manners and the accompanying drawings. It can be understood that the exemplary embodiments described herein are merely illustrative of the present disclosure and are not intended to limit the present disclosure.

Embodiment 1

Figure 1:
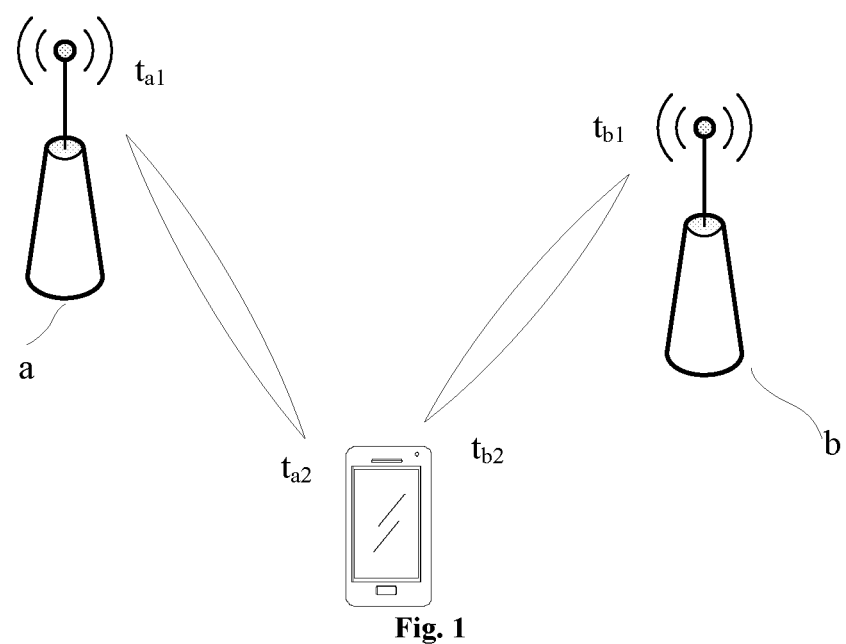
FIG. 1 is a schematic diagram of determining a time difference of arrival according to Embodiment 1 of the present disclosure.

In order to achieve accurate downlink positioning, it is often necessary to position a terminal to be positioned (the terminal to be positioned will be referred to herein as "terminal" for ease of description) using multiple neighbor cells. In an LTE system, for example, these neighbor cells may transmit positioning reference signals, i.e., PRSs, in a broadcast manner. The terminal serves as a receiving node to detect the PRSs transmitted by the neighbor cells and calculate a time difference of arrival of the PRSs transmitted by the neighbor cells. FIG. 1 shows a schematic diagram of determining a time difference of arrival. Taking base stations as neighbor cells for description, a time difference of arrival Δt of PRSs transmitted by two base stations (base station a and base station b respectively) may generally be expressed as follows:

$$\Delta t = (ta2-ta1)-(tb2-tb1)$$

Herein, ta1 refers to a moment when base station a transmits a PRS, i.e. a transmission moment, and ta2 refers to a moment when the PRS transmitted by base station a is detected by a terminal, i.e. a detection moment. Similarly, tb1 refers to a transmission moment when base station b transmits a PRS, and tb2 refers to a detection moment of the PRS transmitted by base station b.

Therefore, the time difference of arrival Δt may actually be understood as a difference between the transmission time length of the PRS from one base station and the transmission time length of the PRS from another base station. By calculating the time difference of arrival, a distance difference between the two base stations and the terminal may be calculated according to a propagation speed (usually light speed) of the signal. Therefore, for the case where there are n base stations, the terminal can calculate at most $C_n^2$ time differences of arrival, that is, $C_n^2$ distance differences by detecting PRSs broadcast by the n base stations. The positioning server or the terminal may then calculate the current position of the terminal based on these distance differences and the known positions of the base stations.

Of course, it can be understood that in some cases, the terminal does not need to calculate the time differences of arrival for all the combinations (combinations of any two base stations) of positioning base stations. For example, in some examples of the present embodiment, for four base stations A, B, C, and D, there may be six combinations according to the combination of $C_4^2$, i.e. there are six combinations of base stations available for calculating the time differences of arrival (for convenience in the following description, two positioning base stations for calculating a time difference of arrival are referred to as "positioning base station pair"). Therefore, six time differences of arrival may be calculated. However, in the actual positioning process, the terminal may take one of the base stations as a positioning reference base station and calculate the time differences of arrival between the PRS beams transmitted by the other three base stations and the PRS beam transmitted by the positioning reference base station, respectively.

Figure 2:
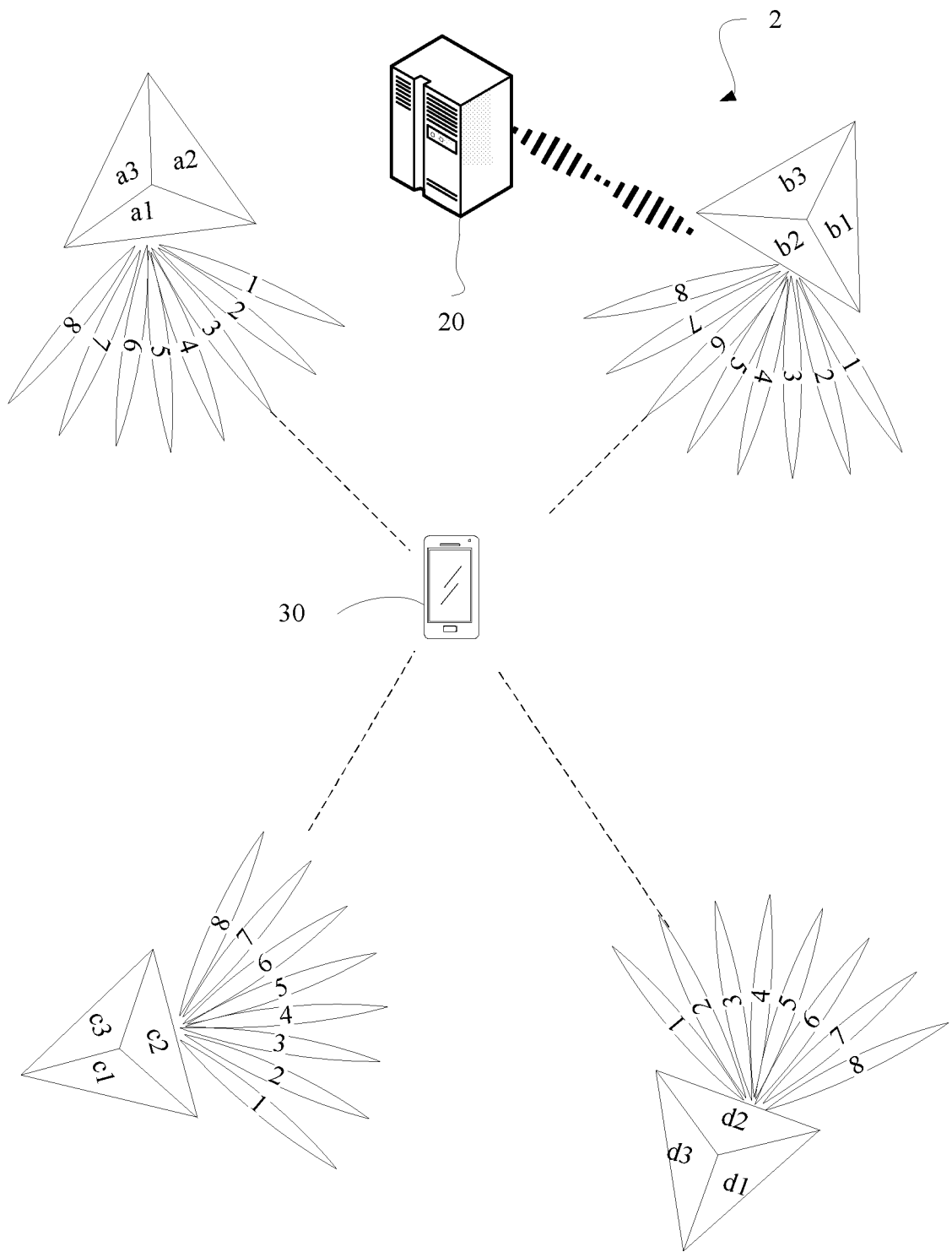
FIG. 2 is a schematic diagram of a communication system according to Embodiment 1 of the present disclosure.

It can be seen that the determination of a time difference of arrival is very critical in a downlink positioning scheme. Therefore, the present embodiment provides a scheme in which a time difference of arrival of PRSs transmitted by two base stations can be determined in a millimeter wave communication scenario. In this scheme, a positioning server, neighbor cells for positioning and a terminal are required to cooperate to achieve the positioning. FIG. 2 shows a schematic diagram of a communication system. In the communication system 2, a positioning server 20, a terminal 30 and multiple cells are included. It is assumed that cell identities of the cells are a1, a2, a3, b1, b2, b3, c1, c2, c3, d1, d2, and d3, respectively. The positioning server 20 may be in communication connection with the terminal 30, and each cell may be in communication connection with the positioning server 20. It can be understood that the communication connection between the terminal 30 and the positioning server 20 may be implemented by one or more of the cells therein. In addition, in the communication system 2, there may be multiple terminals, and there may also be multiple terminals requiring positioning at the same time. Since the positioning of each terminal is similar, the positioning for only one terminal will be described herein.

Figure 3:
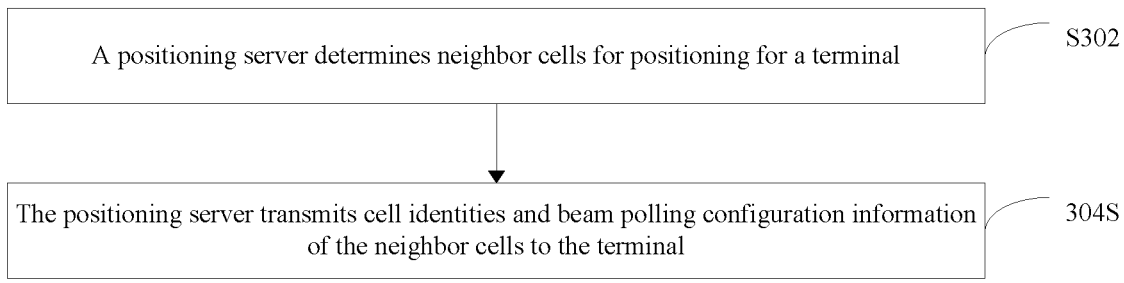
FIG. 3 is a flowchart of a method for determining a time difference of arrival from the perspective of a positioning server according to Embodiment 1 of the present disclosure.

The method executed by the positioning server in the process of determining a time difference of arrival is described below with reference to the accompanying drawings. Reference is made to the flowchart of a method for determining a time difference of arrival from the perspective of a positioning server shown in FIG. 3.

In S302, a positioning server determines neighbor cells for positioning for a terminal.

When the positioning server has a positioning requirement for a terminal, this terminal may be seen as the terminal to be positioned. The positioning requirement may be initiated by the terminal, by the positioning server, or by other terminals or other network elements.

It can be understood that when the positioning server determines, for a terminal to be positioned, the neighbor cells for positioning, it is necessary to ensure that PRS beams transmitted by the neighbor cells determined for the terminal can be detected by the terminal as much as possible, otherwise the determined neighbor cells cannot achieve a positioning function. In the present embodiment, the positioning server may determine the neighbor cells for positioning for the terminal based on a coverage range of a serving cell of the terminal.

A terminal may be under the coverage range of multiple cells at the same time, however, typically the cells do not serve the target at the same time, that is, the cells do not serve the terminal at the same time. The serving cell refers to a cell currently establishing a Radio Resource Control (RRC) connection with a terminal. It is assumed that the serving cell of the terminal 30 in FIG. 2 is b2.

In order to enable the positioning server to know the serving cell of the terminal, the terminal may report to the positioning server, or the serving cell may inform the positioning server. Therefore, the positioning server may determine the serving cell of the terminal in any one of two manners.

In manner 1, the positioning server receives first cell report information transmitted by the terminal, and determines a serving cell currently serving the terminal according to the first cell report information. In the present embodiment, the terminal may transmit the first cell report information to the positioning server through at least one of an LTE Positioning Protocol (LPP) message and a New Radio (NR) Positioning Protocol (NRPP) message. Undoubtedly, when the terminal transmits the first cell report information to the positioning server, the report may be conducted actively, or may be conducted passively according to a request after receiving the request from the positioning server.

It can be understood that the first cell report information needs to carry information capable of indicating the serving cell, such as a cell identity of the serving cell, etc. In a case where the terminal 30 in FIG. 2 reports the serving cell of the terminal, the terminal 30 may carry a serving cell identity "b2" in the first cell report information. In addition, since the communication between the terminal and the positioning server usually needs to be implemented through the serving cell, the terminal may need to transmit the first cell report information to the serving cell before the serving cell forwards the information to the positioning server. However, although the first cell report information is transmitted by the serving cell to the positioning server, this information is essentially reported by the terminal.

In manner 2, the positioning server receives second cell report information transmitted by the serving cell and determines a serving cell of the terminal according to the second cell report information. The serving cell may carry the second cell report information through an NR Positioning Protocol Annex (NRPPa) message. In the scheme, when a cell provides services for a certain terminal as a serving cell, the cell may report to the positioning server, so that the positioning server may know that this cell is a serving cell of the certain terminal according to the reporting of the cell. In the subsequent process, when the positioning requirement for the terminal exists, the positioning server may determine the serving cell of the terminal according to the report in advance. Therefore, in the reporting manner, the serving cell not only carries information indicating that the instant cell is the serving cell in the second cell report information, but also indicates which terminal the serving cell serves in the second cell report information. As for the positioning server, after receiving the second cell report information, the second cell report information may be analyzed to obtain a corresponding relationship between the terminal and the serving cell. In one example of the present embodiment, the positioning server may store the mapping relationship for future query when there is a positioning requirement for the terminal.

In the scheme that the serving cell reports a terminal serving cell to the positioning server through the second cell report information, besides active reporting by the serving cell, the positioning server may also firstly transmit a base station report request to the serving cell, and the serving cell transmits a second cell report message to the positioning server through an NRPPa message according to the base station report request. Since it is not possible for the positioning server to determine which cell is the serving cell of the terminal, the positioning server may need to transmit cell report requests to multiple cells to determine which cell is the serving cell of the terminal (e.g., in a polling manner).

It can be understood that in some examples of the present embodiment, the positioning server may determine the serving cell of the terminal according to both the first cell report information transmitted by the terminal and the second cell report information transmitted by the serving cell.

After the positioning server determines the serving cell of the terminal, the range in which the terminal is located may be roughly determined. The terminal is certain to be in a coverage range of the serving cell. Therefore, the positioning server may determine the neighbor cells for positioning for the terminal based on the coverage range of the serving cell. Typically, there are multiple neighbor cells determined by the positioning server. For example, during positioning using an OTDOA positioning principle, the positioning server needs to determine at least four neighbor cells for the terminal. Of course, the number of the neighbor cells for positioning may be smaller during positioning using other positioning principles, but the number of neighbor cells determined by the positioning server is usually more than one in order to achieve accurate downlink positioning. In addition, when the complexity of determining a time difference of arrival on a terminal is not considered, the positioning server may select more than necessary number of neighbor cells for the terminal, so that the accuracy of a positioning result can be improved.

In some examples of the present embodiment, the positioning server may determine neighbor cells according to the coverage range of the serving cell of the terminal. For example, the positioning server may select neighbor cells having a coverage range overlapping with the coverage range of the serving cell as neighbor cells for positioning the terminal. For another example, the positioning server may select the serving cell and other neighbor cells having a coverage range overlapping with the serving cell as neighbor cells for positioning the terminal. Of course, in some examples of the present embodiment, there may be a case where a large number of neighbor cells overlap with the coverage range of the terminal. In such a case, if the neighbor cells are all used as neighbor cells for positioning the terminal, there may be a problem that the number of selected neighbor cells is excessive, and the complexity is high when the terminal performs signal measurement and time difference of arrival calculation. Therefore, in some examples of the present embodiment, the positioning server may also screen among these neighbor cells, such as only selecting neighbor cells that have an overlap rate with the coverage range of the serving cell not lower than a preset overlap threshold as the neighbor cells for positioning, etc.

In the above example, the positioning server determines the neighbor cells for positioning according to the coverage range of the serving cell of the terminal. An alternative example of the present embodiment provides another scheme for determining a neighbor cell. In this scheme, the positioning server may determine the neighbor cells for positioning for the terminal according to a connection beam of the terminal.

The connection beam refers to a beam currently used by the terminal to communicate with the serving cell. It can be understood that the coverage range of the connection beam is typically smaller than the coverage range of the serving cell, but the terminal is certain to be within the coverage range of the connection beam because the terminal will communicate with the serving cell using the connection beam. Therefore, the neighbor cells for positioning determined by the positioning server according to the coverage range of the connection beam are more suitable for the terminal, and the accuracy is higher.

In one example of the present embodiment, the positioning server may determine the neighbor cells for positioning for the terminal according to the coverage range of the serving cell of the terminal and the coverage range of the connection beam of the terminal. For example, the positioning server may determine a part of candidate neighbor cells according to the coverage range of the serving cell, and then the positioning server may select the neighbor cells for positioning from the candidate neighbor cells in combination with the coverage range of the connection beam. For the communication system 2 shown in FIG. 2, it is assumed that the candidate neighbor cells determined by the positioning server 20 according to the serving cell b2 include a1, a2, a3, b1, b2, c2, d2, and d3. The connection beam between the serving cell b2 and the terminal 30 is a beam 3, the positioning server 30, after determining the connection beam 3, may further determine the neighbor cells for positioning in combination with the coverage range of the connection beam 3. It is assumed that the neighbor cells for positioning finally selected by the positioning server 30 include base stations a1, b3, c2, and d2.

Therefore, in practice, in the present embodiment, the positioning server may determine neighboring cells for positioning for the terminal based on the coverage range of the serving cell of the terminal and/or the coverage range of the connection beam.

The positioning server may determine the connection beam of the terminal in any one of the following manners.

In manner 1, the positioning server receives a report of the terminal, and determines a connection beam according to the report of the terminal. For example, the terminal may transmit first beam determination information to the positioning server. In some exemplary implementation, the first beam determination information may be transmitted based on at least one of an LPP and an NRPP, i.e. the first beam determination information may be transmitted by at least one of an LPP message and an NRPP message. Based on the first beam determination information transmitted by the terminal, the positioning server can determine a connection beam that the terminal uses to communicate with the serving cell of the terminal.

In manner 2, the positioning server determines a connection beam between the serving cell and the terminal according to the report of the serving cell. For example, the serving cell may transmit second beam determination information to the positioning server by an NRPPa message. The second beam determination information may enable the positioning server to determine a connection beam used for communication between the terminal to be positioned and the serving cell.

In manner 3, the positioning server may determine a connection beam between a terminal and a service terminal according to information transmitted by an Access Mobility Function (AMF) network element. For example, the AMF network element may transmit third beam determination information for indicating the connection beam of the terminal to the positioning server through an NLs interface.

In S304, the positioning server transmits cell identities and beam polling configuration information of the neighbor cells to the terminal.

After the positioning server determines the neighbor cells for positioning for the terminal, the positioning server may inform the terminal of the selected neighbor cells and also transmit beam polling configuration information of the neighbor cells to the terminal. Therefore, in one example of the present embodiment, the positioning server may transmit cell identities of the neighbor cells and the beam polling configuration information to the terminal. In some exemplary implementation, the positioning server may transmit the cell identities and the beam polling configuration information to the terminal through an LPP message or an NRPP message. The beam polling configuration can indicate information related to the transmission, at the neighbor cell, of the PRS beam carrying the PRS signal. Taking the beam polling configuration information of a neighbor cell b2 as an example, the beam polling configuration information includes, but is not limited to: the number of beams participating in polling, a polling duration in a polling cycle, a polling count in the polling cycle, the number of symbols contained in a single beam, and a beam index of a PRS beam to be transmitted. It can be understood that a duration from the start time of one polling cycle to the start time of the next polling cycle is one polling cycle, but in this polling cycle, the neighbor cell b2 is not always transmitting a PRS beam, i.e. one polling cycle includes operating time at which the PRS beam is transmitted and also includes time at which the PRS beam is not transmitted. The polling duration in the polling cycle refers to the duration of transmitting the PRS beam in the polling cycle. The polling count in the polling cycle refers to how many times a neighbor cell polls multiple beams in one polling cycle. After knowing the information, the terminal can determine the rule that the corresponding neighbor cell performs beam polling, so that the terminal knows when to perform PRS beam detection.

The beam polling configuration information for each neighbor cell is typically configured by the neighbor cell. In some examples of the present embodiment, the beam polling configuration information for each neighbor cell may be the same. However, in other examples of the present embodiment, the beam polling configuration information for each neighbor cell may also be different.

In the present embodiment, a cell may transmit the beam polling configuration information to the positioning server immediately after the cell has configured the beam polling configuration information. Of course, the neighbor cells may also transmit the beam polling configuration information to the positioning server after receiving an information request transmitted by the positioning server. In one example of the present embodiment, the positioning server may transmit an information request to the neighbor cell through an NRPPa message, and may transmit the beam polling configuration information of the cell as a response to the positioning server after the neighbor cell receives the information request from the positioning server. It can be understood that the beam polling configuration information may also be transmitted to the positioning server through the NRPPa message.

It can be understood that neighbor cells do not transmit PRS beams typically for a particular terminal or terminals. Therefore, in some cases, before the terminal acquires neighbor cells and beam polling configuration information for the neighbor cells, the neighbor cells are already transmitting PRS beams. Therefore, after the positioning server transmits the cell identities of the neighbor cells and the beam polling configuration information to the terminal, the terminal may receive PRS beams carrying PRSs transmitted by the corresponding neighbor cells according to the beam polling configuration information, and then determine, according to a detection result, a time difference of arrival of PRS beams transmitted by the cell and another neighbor cell.

In order to overcome the problem of serious attenuation of PRSs transmitted by a base station in a millimeter wave communication scenario, according to the method for determining the time difference of arrival provided by the present embodiment, neighbor cells may transmit PRSs by adopting beams, so that attenuation of the PRSs can be reduced by using narrow beams. When there is a positioning requirement for a terminal, the positioning server may first determine a serving cell of the terminal, then select the neighbor cells for positioning for the terminal based on a coverage range of the serving cell of the terminal, and then transmit cell identities of the neighbor cells to the terminal so that the terminal can know which base stations are required to transmit PRS beams for detection and measurement. In addition, in order to enable the terminal to detect the PRS beams transmitted by the corresponding neighbor cells, the positioning server also transmits beam polling configuration information acquired from the neighbor cells to the terminal. In this way, the positioning server enables the terminal to calculate a time difference of arrival of PRS beams transmitted by one neighbor cell and another neighbor cell based on the PRS beams transmitted by the neighbor cells so as to realize downlink positioning.

Furthermore, in the present embodiment, the positioning server determines the neighbor cells for positioning for the terminal in combination with the coverage range of the connection beam between the terminal and the serving cell of the terminal on the basis of the coverage range of the serving cell of the terminal, so that unsuitable candidate neighbor cells can be eliminated, suitable neighbor cells can be selected for the terminal, and the PRS beams transmitted by the selected neighbor cells can be ensured to be detected by the terminal as much as possible. Therefore, the probability that neighbor cells are not suitable for positioning the terminal is reduced, and the success rate and accuracy of downlink positioning are improved.

Embodiment 2

Figure 4:
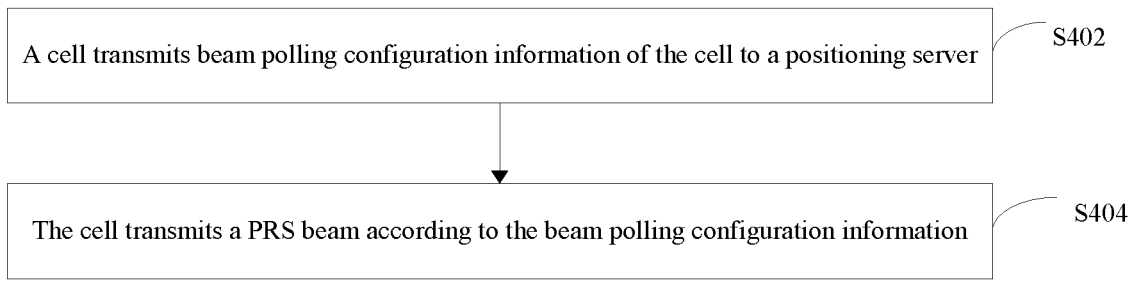
FIG. 4 is a flowchart of a method for determining a time difference of arrival from the perspective of a cell according to Embodiment 2 of the present disclosure.

The present embodiment introduces the flow of a method for determining a time difference of arrival from the perspective of a cell. Reference is made to the flowchart of a method for determining a time difference of arrival from the perspective of a cell shown in FIG. 4.

In S402, a cell transmits beam polling configuration information of a cell to a positioning server.

The cell may transmit the beam polling configuration information of the cell to the positioning server, mainly because after the positioning server selects a neighbor cell for the positioning of a certain terminal from the cell, the beam polling configuration information of the cell needs to be transmitted to the terminal so that the terminal can detect a PRS beam transmitted by the cell according to the beam polling configuration information of the cell.

It can be understood that the cell may transmit the beam polling configuration information of the cell to the positioning server after determining the cell as a neighbor cell of a certain terminal so that the positioning server transmits the beam polling configuration information to the terminal. For example, after the positioning server selects a cell as a neighbor cell for positioning the terminal, a configuration information acquisition request is transmitted to the cell, and after receiving the configuration information acquisition request, the cell transmits the beam polling configuration information of the cell to the positioning server. It can be seen that in this scheme of transmitting a polling configuration request to the positioning server, the cell transmits beam polling configuration information to the positioning server only when the cell serves as a neighbor cell for positioning the terminal. In addition to the above scheme, the present embodiment also provides another scheme.

Since the cell does not transmit a PRS beam for a particular terminal or terminals, i.e., the cell does not transmit a PRS beam for the terminal particularly even if the terminal needs to detect the PRS transmitted by a certain cell to achieve the determination of a time difference of arrival required for positioning. In other words, the cell may transmit the PRS beam regardless of a positioning requirement for the terminal. Therefore, in one example of the present embodiment, even if a cell has not been determined by the positioning server to be a positioning neighbor cell of a certain terminal, the beam polling configuration information of the cell may also be transmitted to the positioning server. In this way, when the positioning server selects the cell as a positioning neighbor cell for implementing the positioning of a certain terminal, the corresponding beam polling configuration information may be directly transmitted to the terminal without being temporarily acquired from the cell. Therefore, in this scheme, when the cell transmits beam polling configuration information to the positioning server, the cell has not determined that the cell will participate in the positioning of the terminal.

In the present embodiment, the interaction between the cell and the positioning server may be performed through an NRPPa message. Therefore, the cell may carry the beam polling configuration information of the cell in the NRPPa message and transmit the NRPPa message to the positioning server.

The beam polling configuration can indicate information related to the transmission, at the cell, of the PRS beam carrying the PRS signal. In one example of the present embodiment, the beam polling configuration information includes, but is not limited to, the number of beams participating in polling, a polling duration in a polling cycle, a polling count in the polling cycle, the number of symbols contained in a single beam, and a beam index of a PRS beam to be transmitted.

Figure 5:
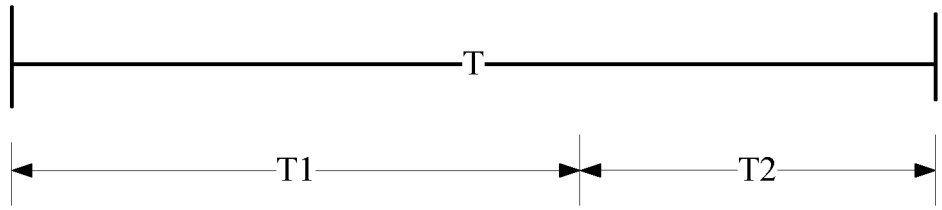
FIG. 5 is a schematic diagram of a polling cycle T according to Embodiment 2 of the present disclosure.

It can be understood that a duration from the start time of one polling cycle to the start time of the next polling cycle is equal to one polling cycle, but in this polling cycle, the cell is not always transmitting a PRS beam, i.e. one polling cycle includes operating time at which the PRS beam is transmitted and also includes time at which the PRS beam is not transmitted. As shown in FIG. 5, a polling cycle T includes two parts, namely T1 and T2. T1 refers to a polling duration in the polling cycle, and T2 refers to a duration that the PRS beam does not need to be transmitted in the polling cycle.

The polling count in the polling cycle refers to how many times a cell polls each beam in one polling cycle.

The number of symbols contained in a single beam refers to the number of Orthogonal Frequency Division Multiplex (OFDM) symbols carried in each PRS beam transmitted by the cell.

In some examples of the present embodiment, the beam polling configuration information of one cell may be the same as the beam polling configuration information of another cell or other cells. Of course, it is also possible that the beam polling configuration information of one cell is different from the beam polling configuration information of any other cell.

In S404, the cell transmits a PRS beam according to the beam polling configuration information.

It can be seen from the above description that if a cell is selected as a neighbor cell for the positioning of a certain terminal, in order to assist the terminal in determining a time difference of arrival of a PRS beam so as to achieve the positioning of the terminal, the cell needs to transmit the PRS beam. Therefore, the cell will transmit the beam polling configuration information to the positioning server, the positioning server transmits the beam polling configuration information to the terminal to enable the terminal to detect the PRS beam transmitted by the base station, and the cell transmits the PRS beam according to the beam polling configuration information. However, this does not mean that the time at which the cell starts to transmit a PRS beam has to be after the cell has transmitted beam polling configuration information to the positioning server. Because transmitting the PRS beam is not specific to a particular terminal for a cell, in some examples of the present embodiment, the cell may start to transmit the PRS beam according to the beam polling configuration information of the cell before transmitting the beam polling configuration information to the positioning server.

In order to enable the terminal to calculate a time difference of arrival between two PRS beams after detecting the PRS beams transmitted by the cell and another cell, in the present embodiment, the PRS beams transmitted by the cell carry transmission moment information indicating the transmission moments of the PRS beams. In this way, after a certain terminal detects the PRS beam, the transmission time length of the PRS beam may be determined, and the terminal may calculate a time difference of arrival of PRSs transmitted by the cell and another cell by combining the transmission moment and the detection moment of the PRS beam of another cell.

The transmission moment information carried in the PRS beam may take various forms. For example, the transmission moment information carried in the PRS beam may be information indicating a sequence number of the first symbol transmitted by the PRS beam or index information of the PRS beam. In addition, when a cell transmits a PRS beam, the sequence number of the first symbol transmitted by the PRS beam may also be directly converted into time information and then carried in the PRS beam, i.e. the transmission moment information carried in the PRS beam may also be a transmission time stamp of the PRS beam. Even in some examples of the present embodiment, the PRS beam may simultaneously carry two or three of the above three types of information as transmission moment information.

According to the description of Embodiment 1, it can be seen that the serving cell of the terminal and/or a connection beam between the terminal and the serving cell of the terminal may be reported to the positioning server by the serving cell of the terminal. Therefore, in some examples of the present embodiment, when the cell serves as a serving cell of a certain terminal, the cell also needs to report the serving cell and/or the connection beam of the terminal to the positioning server. The process of reporting a serving cell by a cell which is currently serving as a serving cell and the process of reporting a connection beam are respectively described as follows.

If the cell needs to report the serving cell of the terminal to the positioning server, the cell may transmit second cell report information to the positioning server. In the second cell report information, the cell may indicate to the positioning server that the cell is the serving cell of a certain terminal, or indicate to the positioning server that the serving cell of a certain terminal is the cell.

If a cell needs to report a connection beam between the terminal and the cell to the positioning server, the cell may transmit second beam determination information to the positioning server. In the second beam determination information, the cell may specify a beam used for current communication between the cell and the terminal. For example, the cell may take a beam transmitting a synchronization signal to the terminal as the connection beam, and carry a beam index of the connection beam in the second beam determination information. Of course, the connection beam is not limited to a beam for transmitting the synchronization signal, but may also be a beam for transmitting other control signaling, or a beam for transmitting traffic data.

Whether the second cell report information is transmitted or the second beam determination information is transmitted, the cell may perform passive transmission after receiving a corresponding request of the positioning server, or may actively transmit the second cell report information and/or the second beam determination information to the positioning server without receiving the request. In the present embodiment, the communication between the cell and the positioning server may be performed via an NRPPa message, but this is merely an alternative and not the only way in which the communication between the cell and the positioning server may occur.

According to the method for determining the time difference of arrival provided by the present embodiment, the cell may transmit a PRS beam carrying transmission moment information according to the beam polling configuration information, so that the terminal may determine a time difference of arrival between the PRS beam transmitted by the cell and the PRS beams transmitted by other cells by detecting the PRS beam. According to the scheme, the terminal may detect PRSs transmitted by neighbor cells without being influenced by the millimeter wave attenuation problem, so that the time difference of arrival is calculated, and the positioning of the terminal is completed.

Embodiment 3

Figure 6:
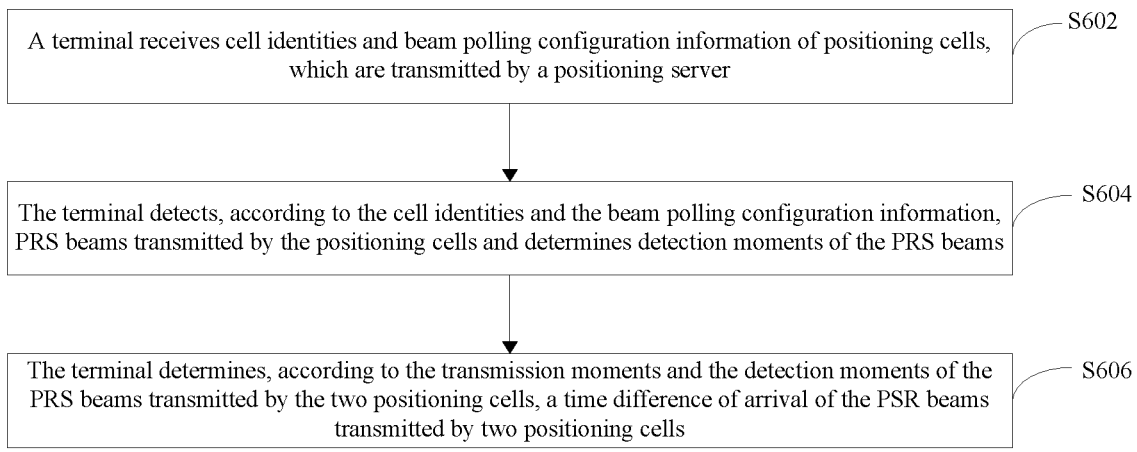
FIG. 6 is a flowchart of a method for determining a time difference of arrival on a terminal according to Embodiment 3 of the present disclosure.

The present embodiment describes a method for determining a time difference of arrival from the perspective of a terminal. Reference is made to the flowchart of a method for determining a time difference of arrival on a terminal shown in FIG. 6.

In S602, a terminal receives cell identities and beam polling configuration information of positioning cells, which are transmitted by a positioning server.

In the present embodiment, after the positioning server determines a neighbor cell for positioning for the terminal (which will be simply referred to as a "positioning cell" in the subsequent contents of the present embodiment), the cell identity and beam polling configuration information of the determined positioning cell are transmitted to the terminal. Therefore, the terminal needs to receive the cell identity and the beam polling configuration information, which are transmitted by the positioning server.

It can be understood that the positioning server, when determining the positioning cell for the terminal, may perform determination based on a coverage range of a serving cell of the terminal and/or a coverage range of a connection beam of the terminal. If the positioning server determines the connection beam for the terminal only according to the coverage range of the serving cell of the terminal, the positioning server needs to acquire the serving cell of the terminal before the positioning server determines the positioning cell for the terminal. It can be seen through the introduction of Embodiment 1 that the serving cell of the terminal may be reported to the positioning server by the terminal or may be reported by the serving cell. Therefore, in some examples of the present embodiment, before the terminal receives the cell identity and the beam polling configuration information transmitted by the positioning server, the terminal may need to report the serving cell of the terminal to the positioning server. For example, the terminal may transmit the first cell report information to the positioning server, and the cell identity of the serving cell of the terminal may be carried in the first cell report information.

It can be understood that when the positioning server determines a positioning cell based on the coverage range of the serving cell, neighbor cells may be directly determined only according to the coverage range of the serving cell of the terminal. For example, a neighbor cell having a coverage range overlapping with the coverage range of the serving cell is selected as a positioning cell; or other positioning cells having a coverage range overlapping with the serving cell are also selected as positioning cells for realizing terminal positioning while selecting the serving cell as a positioning cell. Of course, in some examples of the present embodiment, there may be a case where a large number of cells overlap with the coverage range of the serving cell. In such a case, if the cells are all used as positioning cells for terminal positioning, there may be a problem that the number of selected positioning cells is excessive, and the complexity is high when the terminal performs signal measurement and time difference of arrival calculation. Moreover, in the positioning cells determined according to the coverage range of the serving cell, there may be many cells which transmit PRS beams that cannot be detected by the terminal, so that the accuracy of the positioning cells for positioning directly selected according to the coverage range of the serving cell is low. Therefore, in some examples of the present embodiment, the positioning server may also screen among these neighbor cells, such as only selecting neighbor cells that have an overlap rate with the coverage range of the serving cell not lower than a preset overlap threshold as positioning cells, etc.

In the above example, the positioning server determines the neighbor cells according to the coverage range of the serving cell of the terminal. In another scheme of the present embodiment, the positioning server determines the positioning cell for the terminal according to the connection beam of the terminal. The coverage range of the connection beam is typically smaller than the coverage range of the serving cell, but the terminal is certain to be within the coverage range of the connection beam because the terminal will communicate with the serving cell using the connection beam. Therefore, the positioning cells determined by the positioning server according to the coverage range of the connection beam are more suitable for the terminal, and the accuracy is higher.

In one example of the present embodiment, the positioning server determines the positioning cells in combination with the coverage range of the serving cell and the coverage range of the connection beam. It can be understood that the coverage range of the connection beam is typically smaller than the coverage range of the serving cell, so that the positioning server may determine a part of candidate neighbor cells according to the coverage range of the serving cell, and then in combination with the coverage range of the connection beam, the positioning server may select a positioning cell from the candidate neighbor cells. For the communication system 2 shown in FIG. 2, it is assumed that the candidate neighbor cells determined by the positioning server 20 according to the serving cell b2 include a1, a2, a3, b1, b2, c2, d2, and d3. The connection beam between the serving cell b2 and the terminal 30 is a beam 3, the positioning server 30, after determining the connection beam 3, may further determine positioning cells in combination with the coverage range of the connection beam 3. It is assumed that the positioning cells finally selected by the positioning server 30 include cells a1, b3, c2, and d2.

Therefore, in these examples, before the positioning server determines the positioning cell, the positioning server needs to know which connection beam is used for the current communication between the terminal and the serving cell. In some examples of the present embodiment, the connection beam between the terminal and the serving cell needs to be reported to the positioning server by the terminal. In these examples, before receiving the cell identity of the positioning cell and the beam polling configuration information transmitted by the positioning server, the terminal also needs to transmit first beam determination information to the positioning server. In the first beam determination information, information indicating the connection beam may be carried. It can be understood that the connection beam may be actively reported by the terminal to the positioning server or passively reported after receiving an information request transmitted by the positioning server.

In some examples of the present embodiment, the terminal and the positioning server may communicate based on an LPP message and/or an NRPP message, so that the terminal may transmit first cell report information and/or first beam determination information to the positioning server through the LPP message and/or the NRPP message. A cell identity and beam polling configuration information of a positioning cell for the positioning of the terminal carried by the positioning server via the LPP message and/or the NRPP message may also be received. Of course, the terminal communicating with the positioning server based on the LPP message and the NRPP message are only two examples, and other possible communication modes are not excluded in the present embodiment.

In S604, the terminal detects, according to the cell identities and the beam polling configuration information, PRS beams transmitted by the positioning cells and determines detection moments of the PRS beams.

After receiving the cell identity and the beam polling configuration information transmitted by the positioning server, the terminal may determine positioning cells for positioning, i.e. may determine PRS beams transmitted by cells that need to be detected. Meanwhile, according to the beam polling configuration information, the terminal may determine information such as the number of beams for polling, a polling duration in a polling cycle, a polling count in the polling cycle, and a number of symbols contained in a single beam.

Therefore, according to the cell identity and the beam polling configuration information transmitted by the positioning server, the terminal may detect the PRS beam transmitted by the positioning cell for positioning. In the present embodiment, in order to calculate a time difference of arrival of the PRS beams transmitted by the two positioning cells, the detection moment of the PRS is determined when the terminal detects the PRS beam.

In S606, the terminal determines, according to the transmission moments and the detection moments of the PRS beams transmitted by the two positioning cells, a time difference of arrival of the PSR beams transmitted by two positioning cells.

Since transmission moment information is carried in the PRS beam transmitted by each positioning cell, the transmission moment information carried in the PRS beam may indicate the transmission moment of the PRS beam. Therefore, when the terminal detects a PRS beam, the transmission moment and the detection moment of the PRS beam can be determined. The same process is executed also for PRS beams transmitted by other positioning cells, so that after the terminal detects the PRS beams transmitted by the two positioning cells for positioning, the time difference of arrival of the two PRS beams can be calculated according to the respective transmission moments and detection moments of the two PRS beams.

The transmission moment information carried in the PRS beam may be at least one of: information indicating a sequence number of the first symbol transmitted by the PRS beam, index information of the PRS beam, and a transmission time stamp of the PRS beam. The transmission time stamp of the PRS beam refers to regional standard time carried in the PRS beam by the positioning cell when transmitting the PRS beam, e.g., a:b:c':d", etc.

It can be understood that after receiving PRS beams transmitted by two positioning cells, the terminal may calculate the time difference of arrival of the PRS beams transmitted by the pair of positioning cells. For convenience of description, the two positioning cells in which the transmitted PRS beams are used to calculate the time difference of arrival are referred to as a "positioning cell pair". After the terminal calculates a time difference of arrival of PRS beams transmitted by multiple positioning cells, the terminal may calculate the current position of the terminal based on the time difference of arrival. It can be understood that in order to enable the terminal to calculate the position of the terminal, the positioning server also needs to inform the terminal of the position of each positioning cell for positioning. Therefore, the terminal may calculate the position of the terminal according to the known actual position of each positioning cell and the calculated time difference of arrival. Therefore, in these examples, the positioning server may transmit position information of the positioning cell to the terminal when transmitting the cell identity and the beam polling configuration information of the positioning cell to the terminal.

Of course, in some examples of the present embodiment, the process of determining the current position of the terminal according to the time difference of arrival may be implemented by the positioning server, and in these examples, the positioning server does not need to transmit the position information of the selected positioning cell to the terminal.

According to the method for determining the time difference of arrival provided by the present embodiment, the terminal may determine rules for positioning each positioning cell and transmitting PRS beams by each positioning cell according to the cell identity obtained from the positioning server and the beam polling configuration information of the positioning cells, then detect the PRS beams according to the corresponding PRS beam transmission rules, and calculate the time difference of arrival of the two PRS beams according to the transmission moments and the detection moments of the PRS beams transmitted by the two cells. In this way, a basis for realizing downlink positioning in a millimeter wave scenario is provided and the problem that downlink positioning cannot be accurately performed in the millimeter wave scenario is solved.

Embodiment 4

In the present embodiment, a positioning scheme is introduced on the basis of the previous embodiments. Before the positioning scheme is introduced, a cell is briefly described.

Figure 7:
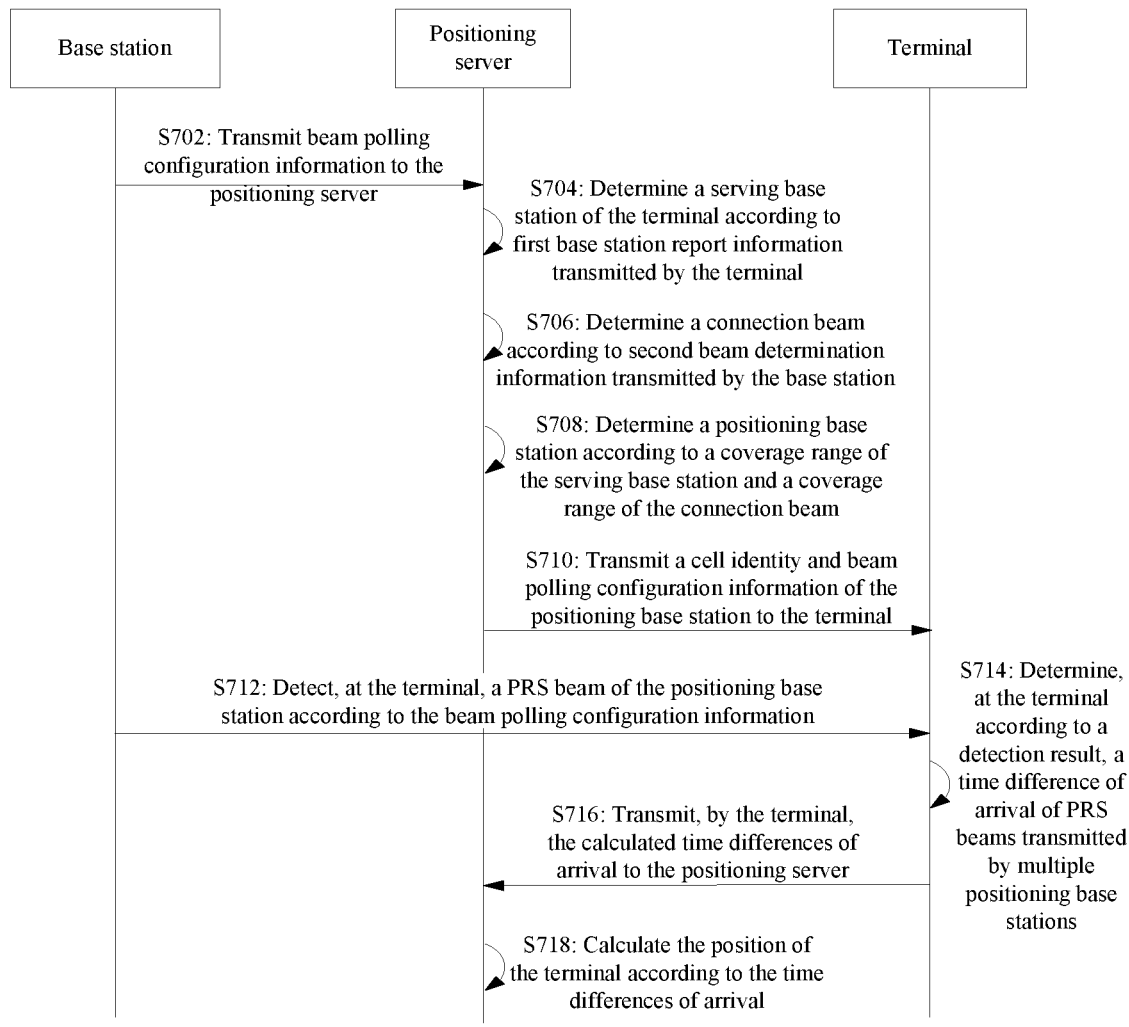
FIG. 7 is a flowchart of a positioning method according to Embodiment 4 of the present disclosure.

In various embodiments of the present disclosure, the positioning of the terminal needs to be achieved based on the PRS beam transmitted by the cell, so the cell should be capable of transmitting the PRS beam. In some examples of the present embodiment, the cell is a base station, but in other examples, the cell may also refer to other transmission nodes other than the base station that are capable of transmitting the beam. A cell is used as a base station to introduce the positioning scheme, and a flowchart of a positioning method is shown in FIG. 7.

In S702, a base station transmits beam polling configuration information to a positioning server.

In the present embodiment, the base station may transmit the beam polling configuration information of the cell to the positioning server through an NRPPa message. In the present embodiment, the beam polling configuration information transmitted by the base station includes a number of beams $N_{beams}^{PRS}$ participating in polling, a polling duration $T_{sweeping}^{PRS}$ in a polling cycle, a polling count $N_{PRS}$ in a polling cycle, and a number of symbols contained in a single beam.

In S704, the positioning server determines a serving base station of a terminal according to first cell report information transmitted by the terminal.

It can be understood that only if a PRS beam transmitted by a positioning base station determined by the positioning server can be detected by the terminal, the positioning base station can assist in terminal positioning; otherwise, if the PRS beam transmitted by the positioning base station cannot be detected by the terminal, the terminal cannot calculate a corresponding time difference of arrival, and there is no way to achieve positioning based on the PRS beam transmitted by the positioning base station. Therefore, the positioning server needs to select an appropriate positioning base station in some ways when determining the positioning base station for a terminal. Since the terminal is certain to be within a coverage range of the serving base station of the terminal, based on the coverage range of the serving base station, the positioning server may roughly determine where the terminal is currently located. In this case, the positioning server may determine, based on the coverage range of the serving base station, base stations as the positioning base stations from which the transmitted PRS beams may be detected by the terminal.

In the present embodiment, when the positioning server needs to locate the terminal, the positioning server may transmit an information report request to the terminal, and when the terminal receives the report request, first cell report information is transmitted to the positioning server according to the request. A base station identity of a terminal serving base station is carried in the first cell report information. The schematic diagram of a communication system shown in FIG. 2 is continuously combined for description: assuming that the current serving base station of the terminal is a base station b2, a base station identity of the base station b2 may be included in the first cell report information.

In some examples of the present embodiment, the positioning server may not need to acquire information of the serving base station from the terminal, e.g., the positioning server may determine the serving base station of the terminal according to second cell report information received from the serving base station.

In addition, in the present embodiment, a Location Management Function (LMF) network element is provided on the positioning server.

In S706, the positioning server determines a connection beam according to second beam determination information transmitted by the base station.

It can be understood that a large number of candidate positioning base stations may be selected based only on the coverage range of the serving base station of the terminal, and that there must be many base stations therein that do not contribute to the positioning of the terminal. In order to further screen these candidate positioning base stations, the positioning server may perform operations based on the coverage range of the connection beam between the terminal and the serving base station of the terminal.

Therefore, in the present embodiment, the positioning server also needs to determine the connection beam between the terminal and the serving base station of the terminal. In one example, the connection beam may be reported by the serving base station: for example, the positioning server may determine which serving base station of the terminal is according to the first cell report information transmitted by the terminal, and in this case, the positioning server may transmit a beam information report request to the serving base station through an NRPPa message. After receiving the second beam determination information transmitted by the serving base station according to the beam report request, the positioning server can determine a connection beam between the terminal and the serving base station.

In other examples of the present embodiment, the positioning server may also learn the connection beam from an AMF network element. For example, the AMF network element may transmit third beam determination information to the positioning server through an NLs interface, and after receiving the third beam determination information, the positioning server determines a connection beam between the terminal and the serving base station of the terminal according to the third beam determination information.

In other examples of the present embodiment, the positioning server may also determine the connection beam currently used for communication between the terminal and the serving base station based on the first beam determination information transmitted by the terminal.

In S708, the positioning server determines a positioning base station according to a coverage range of the serving base station and a coverage range of the connection beam.

After determining the serving base station of the terminal and the connection beam between the terminal and the serving base station, the positioning server may determine the corresponding positioning base station according to the coverage range of the serving base station and the coverage range of the connection beam. In the present embodiment, the positioning of the terminal is realized according to an OTDOA positioning principle, so that the positioning server selects at least four positioning base stations. It is assumed here that in FIG. 2, the positioning base station finally selected by the positioning server for the terminal includes base stations a1, b3, c2, and d2. Of course, in some other examples, the positioning server may determine more than four positioning base stations.

In S710, the positioning server transmits a cell identity and beam polling configuration information of the positioning base station to the terminal.

After determining positioning base stations corresponding to a certain terminal, the positioning server may transmit base station identities and beam polling configuration information of these positioning base stations to the terminal.

It can be understood that since the process of determining the position of the terminal according to the time difference of arrival is not performed by the terminal, but by the positioning server in the present embodiment, the positioning server does not have to transmit the position information of each positioning base station to the terminal in the present embodiment. If the process of determining the position of the terminal according to the time difference of arrival is completed by the terminal, the positioning server may also transmit the position information of each positioning base station to the terminal together.

In S712, the terminal detects a PRS beam of the positioning base station according to the beam polling configuration information.

After receiving base station identities and beam polling configuration information of positioning base stations transmitted by the positioning server, the terminal may determine which positioning base stations exist according to the base station identities, and further detect PRS beams transmitted by the positioning base stations according to the polling configuration information of the positioning base stations.

When a PRS beam transmitted by a certain positioning base station is detected, the terminal may record the moment when the PRS beam is detected by the terminal as detection moment, and then determine the transmission moment of the PRS beam according to transmission moment information carried in the PRS beam. In the example, the terminal detects, at time ta2, a PRS transmitted by base station a1 through beam 3 in a first polling cycle, detects, at time tb2, a PRS transmitted by base station b2 through beam 6 in the first polling cycle, detects, at time tc2, a PRS transmitted by base station c3 through beam 7 in the first polling cycle, and detects, at time td2, a PRS transmitted by base station d2 through beam 2 in a second polling cycle. Therefore, the detection moments of beam 3 of base station a1, beam 6 of base station b2, beam 7 of base station c3 and beam 2 of base station d2 are ta2, tb2, tc2, and td2, respectively. It is assumed that the transmission moment information carried in the four PRS beams indicates the transmission moments of the respective beams as ta1, tb1, tc1, and td1, respectively.

In S714, the terminal determines, according to a detection result, a time difference of arrival of PRS beams transmitted by multiple positioning base stations.

After the terminal detects the PRS beams transmitted by each positioning base station, the time difference of arrival between two of the four PRS beams transmitted by the four positioning base stations can be calculated. For example, the time difference of arrival is $\Delta tab=ta2-tb2-(ta1-tb1)$ for beam 3 of base station a1 and beam 6 of base station b2. The calculation of other time differences of arrival is similar and will not be described in detail here.

It can be understood that if the positioning server determines N positioning base stations for the terminal, the terminal may determine at most time differences of arrival. Of course, in practice, the number of time differences of arrival determined by the terminal may be less than $C_N^2$, because the PRS beams transmitted by some positioning base stations determined by the positioning server may not be successfully detected by the terminal, i.e. a part of the positioning base stations selected by the positioning server for the terminal may not be suitable. On the other hand, if the number of positioning base stations given by the base station is sufficiently large, the terminal can obtain the time difference of arrival sufficient to determine the position of the terminal without calculating the time difference of arrival of all the positioning base station pairs.

Of course, in some cases, more than one of the PRSs transmitted by a positioning base station can be detected by the terminal. For example, it is assumed that both beams 6 and 5 transmitted by base station b2 can be detected by the terminal. In this case, the terminal may calculate the time difference of arrival based on one PRS beam with better signal strength in the detection result.

In S716, the terminal transmits the calculated time differences of arrival to the positioning server.

After each time difference of arrival is calculated by the terminal, the calculated time differences of arrival may be transmitted to the positioning server for the positioning server to calculate and determine the position of the terminal.

In S718, the positioning server calculates the position of the terminal according to the time differences of arrival.

It can be understood that after the positioning server has obtained a time difference of arrival of PRS beams transmitted by two positioning base stations, a distance difference $\Delta d$ between the two positioning base stations and a current position of the terminal can be calculated. For example, it is assumed that the distance difference of the distance between base station a1 and the terminal and the distance between base station b2 and the terminal is $\Delta dab$.

$$\Delta dab=\Delta tab*c$$

where c is a light speed, i.e., a propagation speed of millimeter waves.

In this way, the positioning server can calculate the distance difference between two positioning base stations in multiple base station pairs and the terminal. The positioning base stations mentioned here are positioning base stations at which the transmitted PRS beams can be detected by the terminal.

The current position of the terminal is unknown. It is assumed that the current position of the terminal is (x, y). The positions of base stations a1, b3, c2, and d2 are known.

It is assumed that the coordinates of the four base station positions are (xa1, ya1), (xb3, yb3), (xc2, yc2), and (xd2, yd2), respectively. Distances da1, db3, dc2 and dd2 between base stations a1, b3, c2, and d2 and the terminal may be represented as:

$$d_{a1} = \sqrt{(x_{a1}-x)^2 + (y_{a1}-y)^2}$$

$$d_{b3} = \sqrt{(x_{b3}-x)^2 + (y_{b3}-y)^2}$$

$$d_{c2} = \sqrt{(x_{c2}-x)^2 + (y_{c2}-y)^2}$$

$$d_{d2} = \sqrt{(x_{d2}-x)^2 + (y_{d2}-y)^2}$$

Therefore, the distance difference between base station a1 and base station b3 and the terminal is as follows:

$$\Delta d_{ab} = d_{a1} - d_{b3}$$
$$= \sqrt{(x_{a1}-x)^2 + (y_{a1}-y)^2} - \sqrt{(x_{b3}-x)^2 + (y_{b3}-y)^2}$$

Correspondingly, similar equations may be listed according to the distance difference between the current distances of other positioning base stations and the terminal, the values of x and y can be solved based on the equations, thereby obtaining the current position of the terminal, and achieving the positioning of the terminal.

In the positioning method provided by the embodiments of the present disclosure, the terminal can calculate a time difference of arrival of PRS beams transmitted by multiple positioning base stations, and then the positioning server further determines a current position of the terminal according to the time difference of arrival calculated by the terminal. Positioning base stations transmit PRSs by adopting beams, and therefore the problems that a millimeter wave attenuates seriously in the air and has insufficient diffraction ability are overcome in a manner of narrow beam transmission. The PRS born on the millimeter wave arrives at a terminal and is detected by the terminal, thereby achieving downlink positioning through the calculation of a time difference of arrival, and providing a solution for positioning in a millimeter wave application scenario.

Embodiment 5

Figure 8:
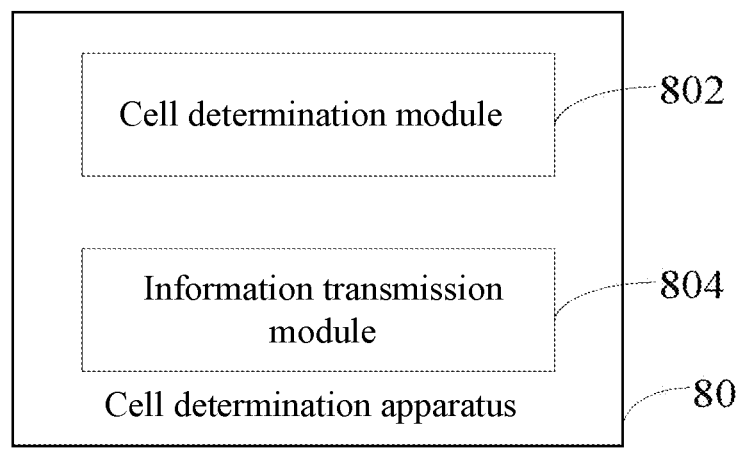
FIG. 8 is a schematic structure diagram of a cell determination apparatus according to Embodiment 5 of the present disclosure.

The present embodiment provides a cell determination apparatus. Reference is made to the schematic structure diagram of a cell determination apparatus 80 in FIG. 8.

The cell determination apparatus 80 includes a cell determination module 802 and an information transmission module 804. The cell determination module 802 is configured to determine the neighbor cells for positioning for a terminal based on a coverage range of a serving cell. The information transmission module 804 is configured to transmit cell identities and beam polling configuration information of the neighbor cells for positioning to the terminal.

When the cell determination apparatus 80 has a positioning requirement for a terminal, the terminal may be used as the terminal. The positioning requirement may be initiated by the terminal, by the cell determination apparatus 80, or by other terminals or other network elements.

It can be understood that when the cell determination module 802 determines the neighbor cells for positioning for a terminal to be positioned, it is necessary to ensure that PRS beams transmitted by the neighbor cells determined for the terminal can be detected by the terminal as much as possible, otherwise the determined neighbor cells cannot achieve a positioning function. In the present embodiment, the cell determination module 802 may determine the neighbor cells for positioning for the terminal based on a coverage range of a serving cell of the terminal.

A terminal may be under the coverage range of multiple cells at the same time, however, typically the cells do not serve the target at the same time, i.e. the cells do not serve the terminal at the same time. The serving cell refers to a cell currently establishing an RRC connection with a terminal. It is assumed that the serving cell of the terminal 30 in FIG. 30 is b2.

In order to enable the cell determination module 802 to know the serving cell of the terminal, the terminal may report to the cell determination module 802, or the serving cell may inform the cell determination module 802. Therefore, for the cell determination module 802, the serving cell of the terminal may be determined in any one of two manners.

In manner 1, the cell determination module 802 receives first cell report information transmitted by the terminal, and determines a serving cell currently serving the terminal according to the first cell report information. In the present embodiment, the terminal may transmit the first cell report information to the serving cell determination module 802 through an LPP (that is, NRPP) message. Undoubtedly, when the terminal transmits the first cell report information to the cell determination module 802, the report may be conducted actively, or may be conducted passively according to a request after receiving the request from the serving cell determination module 802.

It can be understood that the first cell report information needs to carry information capable of indicating the serving cell, such as a cell identity of the serving cell, etc. In a case where the terminal 30 in FIG. 2 reports the serving cell of the terminal, the terminal 30 may carry a serving cell identity "b2" in the first cell report information. In addition, since the communication between the terminal and the cell determination apparatus 80 usually needs to be implemented through the serving cell, the terminal may need to transmit the first cell report information to the serving cell before the serving cell forwards the information to the serving cell determination module 802. However, although the first cell report information is transmitted by the serving cell to the serving cell determination module 802, this information is essentially reported by the terminal.

In manner 2, the serving cell determination module 802 receives second cell report information transmitted by the serving cell and determines a serving cell currently serving the terminal according to the second cell report information. The serving cell may carry the second cell report information through an NRPPa message. In the scheme, when a cell provides services for a certain terminal as a serving cell, the cell may report to the serving cell determination module 802, so that the serving cell determination module 802 may know that this cell is a serving cell of the certain terminal according to the reporting of the cell. In the subsequent process, when the positioning requirement for the terminal exists, the serving cell determination module 802 may determine the serving cell of the terminal according to the report in advance. Therefore, in the reporting manner, the serving cell not only carries information indicating that the instant cell is the serving cell in the second cell report information, but also indicates which terminal the serving cell serves in the second cell report information. As for the serving cell determination module 802, after receiving the second cell report information, the second cell report information may be analyzed to obtain a corresponding relationship between the terminal and the serving cell. In one example of the present embodiment, the serving cell determination module 802 may store the mapping relationship for future query when there is a positioning requirement for the terminal.

Of course, in the scheme that the serving cell reports a terminal serving cell to the serving cell determination module 802 through the second cell report information, besides active reporting by the serving cell, the serving cell determination module 802 may also firstly transmit a cell report request to the serving cell, and the serving cell transmits a second cell report message to the serving cell determination module 802 through an NRPPa message according to the cell report request. Since it is not possible for the serving cell determination module 802 to determine which cell is the serving cell of the terminal, the positioning server may need to transmit cell report requests to multiple cells to determine which cell is the serving cell of the terminal (e.g., in a polling manner).

It can be understood that in some examples of the present embodiment, the serving cell determination module 802 may determine the serving cell of the terminal according to both the first cell report information transmitted by the terminal and the second cell report information transmitted by the serving cell.

After the serving cell determination module 802 determines the serving cell of the terminal, the range in which the terminal is located may be roughly determined. The terminal is certain to be in a coverage range of the serving cell. Therefore, the cell determination module 802 may determine the neighbor cells for positioning for the terminal based on the coverage range of the serving cell. Typically, there are multiple neighbor cells determined by the cell determination module 802. For example, during positioning using an OTDOA positioning principle, the cell determination module 802 needs to determine at least four neighbor cells for the terminal. Of course, the number of neighbor cells may be smaller during positioning using other positioning principles, but the number of neighbor cells is usually more than one in order to achieve accurate downlink positioning. In addition, when the complexity of determining a time difference of arrival on a terminal is not considered, the cell determination module 802 may select more than necessary number of neighbor cells for the terminal, so that the accuracy of a positioning result can be improved.

In some examples of the present embodiment, the cell determination module 802 may directly determine neighbor cells for positioning the terminal only according to the coverage range of the serving cell of the terminal, or select the serving cell and other neighbor cells having a coverage range overlapping with the serving cell as neighbor cells for positioning the terminal. Of course, in some examples of the present embodiment, there may be a case where a large number of neighbor cells overlap with the coverage range of the terminal. In such a case, if the neighbor cells are all used as neighbor cells for positioning the terminal, there may be a problem that the number of selected neighbor cells is excessive, and the complexity is high when the terminal performs signal measurement and time difference of arrival calculation. Therefore, in some examples of the present embodiment, the cell determination module 802 may also screen among these neighbor cells, such as only selecting neighbor cells that have an overlap rate with the coverage range of the serving cell not lower than a preset overlap threshold as neighbor cells for positioning the terminal, etc.

In the above example, the cell determination module 802 directly determines the neighbor cells for positioning according to the coverage range of the serving cell of the terminal. An alternative example of the present embodiment provides another scheme for determining a neighbor cell. In this scheme, the cell determination module 802 may determine the neighbor cells for positioning for the terminal according to a connection beam of the terminal.

The connection beam refers to a beam currently used by the terminal to communicate with the serving cell. It can be understood that the coverage range of the connection beam is typically smaller than the coverage range of the serving cell, but the terminal is certain to be within the coverage range of the connection beam because the terminal will communicate with the serving cell using the connection beam. Therefore, the neighbor cells for positioning determined by the cell determination module 802 according to the coverage range of the connection beam are more suitable for the terminal, and the accuracy is higher.

In one example of the present embodiment, the cell determination module 802 may determine the neighbor cells for positioning for the terminal according to the coverage range of the serving cell of the terminal and the coverage range of the connection beam of the terminal. For example, the cell determination module 802 may determine a part of candidate neighbor cells according to the coverage range of the serving cell, and then the cell determination module 802 may select the neighbor cells for positioning from the candidate neighbor cells in combination with the coverage range of the connection beam. It is assumed that candidate neighbor cells determined by the cell determination apparatus 80 according to the serving cell b2 include a1, a2, a3, b1, b2, c2, d2, and d3. The connection beam between the serving cell b2 and the terminal is a beam 3, the cell determination module 802, after determining the connection beam 3, may further determine the neighbor cells for positioning in combination with the coverage range of the connection beam 3. It is assumed that the neighbor cells finally selected by the cell determination module 802 include base stations a1, b3, c2, and d2.

Therefore, in practice, in the present embodiment, the cell determination module 802 may determine neighboring cells for positioning for the terminal based on the coverage range of the serving cell of the terminal and/or the coverage range of the connection beam.

The cell determination module 802 may determine the connection beam of the terminal in any one of the following manners.

In manner 1, the cell determination module 802 receives a report of the terminal, and determines a connection beam according to the report of the terminal. For example, the terminal may transmit first beam determination information to the cell determination module 802. In some exemplary implementation, the first beam determination information may be transmitted based on at least one of an LPP and an NRPP, i.e. the first beam determination information may be transmitted by at least one of an LPP message and an NRPP message. Based on the first beam determination information transmitted by the terminal, the cell determination module 802 may determine a connection beam that the terminal uses to communicate with the serving cell of the terminal.

In manner 2, the cell determination module 802 determines a connection beam between the serving cell and the terminal according to the report of the serving cell. For example, the serving cell may transmit second beam determination information to the cell determination module 802 by an NRPPa message. The second beam determination information may enable the cell determination module 802 to determine a connection beam used for communication between the terminal to be positioned and the serving cell.

In manner 3, the cell determination module 802 may determine a connection beam between a terminal and a service terminal according to information transmitted by an AMF network element. For example, the AMF network element may transmit third beam determination information for indicating the connection beam of the terminal to the cell determination module 802 through an NLs interface.

After the cell determination module 802 determines the neighbor cells for positioning for the terminal, the information transmission module 804 may inform the terminal of the selected neighbor cells and also transmit beam polling configuration information of the neighbor cells to the terminal. Therefore, in one example of the present embodiment, the information transmission module 804 may transmit cell identities of the neighbor cells and the beam polling configuration information to the terminal. In some exemplary implementation, the information transmission module 804 may transmit the cell identities and the beam polling configuration information to the terminal through an LPP message or an NRPP message. The beam polling configuration may indicate information related to the transmission, at the neighbor cell, of the PRS beam carrying the PRS signal. Taking the beam polling configuration information of a neighbor cell b2 as an example: the beam polling configuration information includes, but is not limited to: the number of beams participating in polling, a polling duration in a polling cycle, a polling count in the polling cycle, the number of symbols contained in a single beam, and a beam index of a PRS beam to be transmitted. It can be understood that a duration from the start time of one polling cycle to the start time of the next polling cycle is one polling cycle, but in this polling cycle, the neighbor cell b2 is not always transmitting a PRS beam, i.e. one polling cycle includes operating time at which the PRS beam is transmitted and also includes time at which the PRS beam is not transmitted. The polling duration in the polling cycle refers to the duration of transmitting the PRS beam in the polling cycle. The polling count in the polling cycle refers to how many times a neighbor cell polls multiple beams in one polling cycle. After knowing the information, the terminal can determine the rule that the corresponding neighbor cell performs beam polling, so that the terminal knows when to perform PRS beam detection.

The beam polling configuration information for each neighbor cell is typically configured by the neighbor cell. In some examples of the present embodiment, the beam polling configuration information for each neighbor cell may be the same. However, in other examples of the present embodiment, the beam polling configuration information for each neighbor cell may also be different.

In the present embodiment, a neighbor cell may transmit the beam polling configuration information to the cell determination apparatus 80 immediately after the cell has configured the beam polling configuration information. Of course, the neighbor cells may also transmit the beam polling configuration information to the cell determination apparatus 80 after receiving an information request transmitted by the cell determination apparatus 80. In one example of the present embodiment, the cell determination apparatus 80 may transmit an information request to the cell through an NRPPa message, and may transmit the beam polling configuration information of the cell as a response to the cell determination apparatus 80 after the cell receives the information request from the cell determination apparatus 80. It can be understood that the beam polling configuration information may also be transmitted to the cell determination apparatus 80 through the NRPPa message.

It can be understood that neighbor cells do not transmit PRS beams typically for a particular terminal or terminals. Therefore, in some cases, before the terminal acquires neighbor cells and beam polling configuration information for the neighbor cells, the neighbor cells are already transmitting PRS beams. Therefore, after the information transmission module 804 of the cell determination apparatus 80 transmits the cell identities of the neighbor cells and the beam polling configuration information to the terminal, the terminal may receive PRS beams carrying PRSs transmitted by the corresponding neighbor cells according to the beam polling configuration information, and then determine, according to a detection result, a time difference of arrival of PRS beams transmitted by the cell and another neighbor cell.

The cell determination apparatus 80 provided by the present embodiment may be deployed on a positioning server. For example in a 5G communication system, the positioning server may include a server with LMF network elements. The functions of the cell determination module 802 and the information transmission module 804 may be realized through a processor of the positioning server and a communication unit.

In order to overcome the problem of serious attenuation of PRSs transmitted by a cell in a millimeter wave communication scenario, according to the method for determining the time difference of arrival provided by the present embodiment, neighbor cells may transmit PRSs by adopting beams, so that attenuation of the PRSs can be reduced by using narrow beams. When there is a positioning requirement for a terminal, the cell determination apparatus may first determine a serving cell of the terminal, then select the neighbor cells for positioning for the terminal based on a coverage range of the serving cell of the terminal, and then transmit cell identities of the corresponding neighbor cells to the terminal so that the terminal can know which cells are required to transmit PRS beams for detection and measurement. In addition, in order to enable the terminal to detect the PRS beams transmitted by the neighbor cells for positioning, the cell determination apparatus may also transmit beam polling configuration information acquired from the neighbor cells to the terminal. In this way, the cell determination apparatus enables the terminal to calculate a time difference of arrival of PRS beams transmitted by one neighbor cell and another neighbor cell based on the PRS beams transmitted by the neighbor cells so as to realize downlink positioning.

Furthermore, in the present embodiment, the cell determination apparatus determines the neighbor cells for positioning for the terminal in combination with the coverage range of the connection beam between the terminal and the serving cell of the terminal on the basis of the coverage range of the serving cell of the terminal, so that unsuitable candidate neighbor cells can be eliminated, suitable neighbor cells can be selected for the terminal, and the PRS beams transmitted by the selected neighbor cells can be ensured to be detected by the terminal as much as possible. Therefore, the probability that neighbor cells are not suitable for positioning the terminal is reduced, and the success rate and accuracy of downlink positioning are improved.

Embodiment 6

Figure 9:
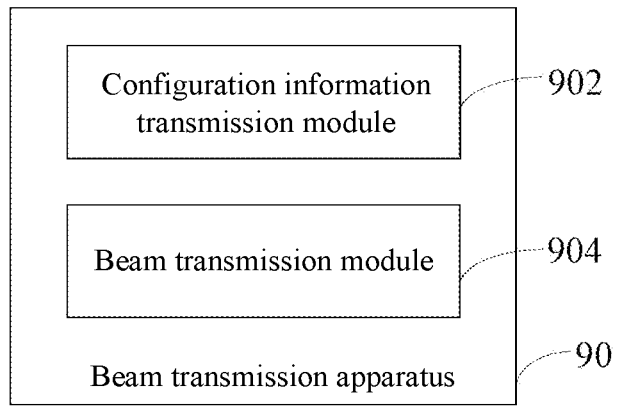
FIG. 9 is a schematic structure diagram of a beam transmission apparatus according to Embodiment 6 of the present disclosure.

The present embodiment provides a beam transmission apparatus. The schematic structure diagram of the beam transmission apparatus is shown in FIG. 9.

The beam transmission apparatus 90 includes a configuration information transmission module 902 for transmitting beam polling configuration information of a cell to a positioning server, and a beam transmission module 904 for transmitting a PRS beam according to the beam polling configuration information.

The configuration information transmission module 902 will transmit the beam polling configuration information of the beam transmission apparatus 90 to the positioning server, mainly because the beam polling configuration information of the beam transmission apparatus 90 needs to be transmitted to the terminal after the positioning server selects the beam transmission apparatus 90 as a neighbor cell for realizing the positioning of a certain terminal. The terminal detects the PRS beam transmitted by the beam transmission module 904 of the beam transmission apparatus 90 according to the beam polling configuration information of the beam transmission apparatus 90.

It can be understood that the configuration information transmission module 902 may transmit the beam polling configuration information of the beam transmission apparatus 90 to the positioning server after determining the beam transmission apparatus 90 as a neighbor cell of a certain terminal so that the positioning server transmits the beam polling configuration information to the terminal. For example, after the positioning server selects the beam transmission apparatus 90 as a neighbor cell of a terminal, a configuration information acquisition request is transmitted to the beam transmission apparatus 90, and after receiving the configuration information acquisition request, the configuration information transmission module 902 transmits the beam polling configuration information of the beam transmission apparatus 90 to the positioning server. It can be seen that in this scheme of transmitting a polling configuration request to the positioning server, the configuration information transmission module 902 transmits beam polling configuration information to the positioning server only when the beam transmission apparatus 90 has served as a neighbor cell. In addition to the above scheme, the present embodiment also provides another scheme.

Since the beam transmission module 904 of the beam transmission apparatus 90 does not transmit a PRS beam for a particular terminal or terminals, i.e., the beam transmission module 904 does not transmit a PRS beam for the terminal particularly even if the terminal needs to detect the PRS transmitted by the beam transmission apparatus 90 to achieve the determination of a time difference of arrival required for positioning. In other words, the beam transmission module 904 may transmit the PRS beam regardless of a positioning requirement for the terminal. Therefore, in one example of the present embodiment, even if a beam transmission apparatus 90 has not been determined by the positioning server to be a positioning neighbor cell of a certain terminal, the configuration information transmission module 902 may also transmit beam polling configuration information to the positioning server. In this way, when the positioning server determines the beam transmission apparatus 90 as a neighbor cell for implementing the positioning of a certain terminal, the corresponding beam polling configuration information may be directly transmitted to the terminal without being temporarily acquired from the beam transmission apparatus 90. Therefore, in this scheme, when the configuration information transmission module 902 transmits beam polling configuration information to the positioning server, the beam transmission apparatus 90 has not determined that the cell will participate in the positioning of the terminal.

In the present embodiment, the interaction between the configuration information transmission module 902 and the positioning server may be performed through an NRPPa message, so that the configuration information transmission module 902 may carry the beam polling configuration information of the beam transmission apparatus 90 in the NRPPa message and transmit the NRPPa message to the positioning server.

The beam polling configuration can instruct the beam transmission module 904 to transmit relevant information of PRS beams carrying PRSs. In one example of the present embodiment, the beam polling configuration information includes, but is not limited to: the number of beams participating in polling, a polling duration in a polling cycle, a polling count in the polling cycle, the number of symbols contained in a single beam, and a beam index of a PRS beam to be transmitted.

It can be understood that a duration from the start time of one polling cycle to the start time of the next polling cycle is equal to one polling cycle, but in this polling cycle, the beam transmission module 904 is not always transmitting a PRS beam, i.e. one polling cycle includes operating time at which the PRS beam is transmitted and also includes time at which the PRS beam is not transmitted. As shown in FIG. 5, a polling cycle T includes two parts, namely T1 and T2. T1 refers to a polling duration in the polling cycle, and T2 refers to a duration that the PRS beam does not need to be transmitted in the polling cycle.

The polling count in the polling cycle refers to how many times the beam transmission module 904 polls each beam in one polling cycle.

The number of symbols contained by a single beam refers to the number of OFDM symbols carried in each PRS beam transmitted by the beam transmission module 904.

In some examples of the present embodiment, the beam polling configuration information of one beam transmission apparatus 90 may be the same as the beam polling configuration information of another cell or beam transmission apparatuses 90. Of course, it is also possible that the beam polling configuration information of one beam transmission apparatus 90 is different from the beam polling configuration information of any other beam transmission apparatus 90.

It can be seen from the above description that if the beam transmission apparatus 90 is selected as a neighbor cell for implementing the positioning of a certain terminal, in order to assist the terminal in determining a time difference of arrival of a PRS beam so as to achieve the positioning of the terminal, the beam transmission module 904 of the beam transmission apparatus 90 needs to transmit the PRS beam, so the configuration information transmission module 902 will transmit the beam polling configuration information to the positioning server, the positioning server transmits the beam polling configuration information to the terminal, and after the terminal detects the PRS beam transmitted by the beam transmission module 904, the beam transmission module 904 transmits the PRS beam according to the beam polling configuration information. However, this does not mean that the time at which the beam transmission module 904 starts to transmit a PRS beam must be after the configuration information transmission module 902 has transmitted beam polling configuration information to the positioning server. Because transmitting the PRS beam is not specific to a particular terminal for the beam transmission module 904, in some examples of the present embodiment, the beam transmission module 904 may start to transmit the PRS beam according to the beam polling configuration information before transmitting the beam polling configuration information to the positioning server.

In order to enable the terminal to calculate a time difference of arrival between two PRS beams after detecting the PRS beams transmitted by the beam transmission module 904 and another cell, in the present embodiment, the PRS beams transmitted by the beam transmission module 904 carry transmission moment information indicating the transmission moments of the PRS beams. In this way, after a certain terminal detects the PRS beam, the transmission moment of the PRS beam can be determined, and the terminal may calculate a time difference of arrival of PRSs transmitted by the beam transmission module 904 and another cell by combining the transmission moment and the detection moment of the PRS beam of another cell.

The transmission moment information carried in the PRS beam may take various forms. For example, the transmission moment information carried in the PRS beam may be information indicating a sequence number of the first symbol transmitted by the PRS beam or index information of the PRS beam. In addition, when the beam transmission module 904 transmits a PRS beam, the sequence number of the first symbol transmitted by the PRS beam may also be directly converted into time information and then carried in the PRS beam, i.e. the transmission moment information carried in the PRS beam may also be a transmission time stamp of the PRS beam. Even in some examples of the present embodiment, the PRS beam may simultaneously carry two or three of the above three types of information as transmission moment information.

Figure 10:
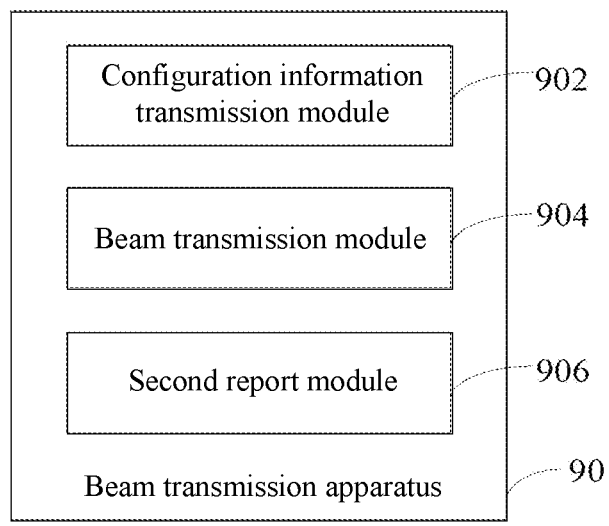
FIG. 10 is another schematic structure diagram of a beam transmission apparatus according to Embodiment 6 of the present disclosure.

According to the description of Embodiment 5, it can be seen that the serving cell of the terminal and/or a connection beam between the terminal and the serving cell of the terminal may be reported to the positioning server by the serving cell of the terminal. Therefore, in some examples of the present embodiment, when the beam transmission apparatus 90 serves as a serving cell of a certain terminal, the cell also needs to report the serving cell and/or the connection beam of the terminal to the positioning server. The schematic structure diagram of another beam transmission apparatus is also provided in FIG. 10. In FIG. 10, the beam transmission apparatus 90 further includes a second report module 906 in addition to the configuration information transmission module 902 and the beam transmission module 904. The second report module 906 is configured to transmit second cell report information to the positioning server, the second cell report information being used to indicate to the positioning server that a serving cell of the terminal is the beam transmission apparatus 90; and/or the second report module 906 is configured to transmit second beam determination information to the positioning server, wherein the second beam determination information is used to indicate to the positioning server that a connection beam used by the beam transmission apparatus 90 currently communicating with the terminal. The processes of reporting a serving cell of a terminal and a connection beam to the second report module 906 are respectively described as follows.

If the second report module 906 needs to report the serving cell of the terminal to the positioning server, the second report module 906 may transmit second cell report information to the positioning server. In the second cell report information, the second report module 906 may indicate to the positioning server that the beam transmission apparatus 90 is the serving cell of a certain terminal, or indicate to the positioning server that the serving cell of a certain terminal is the beam transmission apparatus 90.

If the second report module 906 needs to report a connection beam between the terminal and the beam transmission apparatus 90 to the positioning server, the second report module 906 may transmit second beam determination information to the positioning server. In the second beam determination information, the second report module 906 may specify a beam used for current communication between the beam transmission apparatus 90 and the terminal. For example, the second report module 906 may take a beam transmitting a synchronization signal to the terminal by the beam transmission apparatus 90 as the connection beam, and carry a beam index of the connection beam in the second beam determination information. Of course, the connection beam is not limited to a beam for transmitting the synchronization signal, but may also be a beam for transmitting other control signaling, or a beam for transmitting traffic data.

Whether the second cell report information is transmitted or the second beam determination information is transmitted, the second report module 906 may perform passive transmission after receiving a corresponding request of the positioning server, or may actively transmit the second cell report information and/or the second beam determination information to the positioning server without receiving the request. In the present embodiment, the communication between the second report module 906 and the positioning server may be performed via an NRPPa message, but this is merely an alternative and not the only way in which the communication between the second report module 906 and the positioning server may occur.

The beam transmission apparatus 90 provided by the present embodiment may be deployed on various transmission nodes with beam transmission capability, such as base stations. The functions of the configuration information transmission module 902, the beam transmission module 904 and the second report module 906 may be realized by a processor of the transmission node controlling a communication unit.

According to the beam transmission apparatus provided by the present embodiment, the beam transmission apparatus may transmit a PRS beam carrying transmission moment information according to the beam polling configuration information, so that the terminal may determine a time difference of arrival between the PRS beam transmitted by the beam transmission apparatus and the PRS beams transmitted by other cells by detecting the PRS beam. According to the scheme, the terminal may detect a PRS transmitted by the beam transmission apparatus without being influenced by the millimeter wave attenuation problem, so that the time difference of arrival is calculated, and the positioning of the terminal is completed.

Embodiment 7

Figure 11:
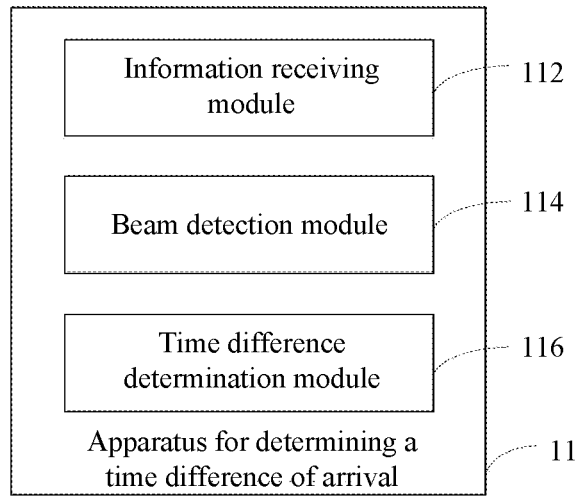
FIG. 11 is a schematic structure diagram of an apparatus for determining a time difference of arrival according to Embodiment 7 of the present disclosure.

The present embodiment provides an apparatus for determining a time difference of arrival, which may be used to perform the method for determining the time difference of arrival provided in Embodiment 3. The schematic structure diagram of an apparatus for determining a time difference of arrival is shown in FIG. 11.

An apparatus for determining a time difference of arrival 11 includes an information receiving module 112, a beam detection module 114 and a time difference determination module 116. The information receiving module 112 is configured to receive cell identities and beam polling configuration information of neighbor cells (which will be simply referred to as "positioning cells" in the subsequent contents of the present embodiment) for positioning, which are transmitted by the positioning server. The beam detection module 114 is configured to detect, according to the cell identities and the beam polling configuration information, PRS beams transmitted by the neighbor cells and determine detection moments of the PRS beams. The time difference determination module 116 is configured to determine, according to the transmission moments and the detection moments of the PRS beams transmitted by the two positioning cells, a time difference of arrival of the PRS beams transmitted by the two positioning cells.

In the present embodiment, after the positioning server determines the positioning cell for the apparatus 11 for determining the time difference of arrival based on a coverage range of a serving cell of the apparatus 11 for determining the time difference of arrival, the cell identities and the beam polling configuration information of the determined neighbor cells are transmitted to the apparatus 11 for determining the time difference of arrival. Therefore, the information receiving module 112 needs to receive the cell identity and the beam polling configuration information, which are transmitted by the positioning server.

Figure 12:
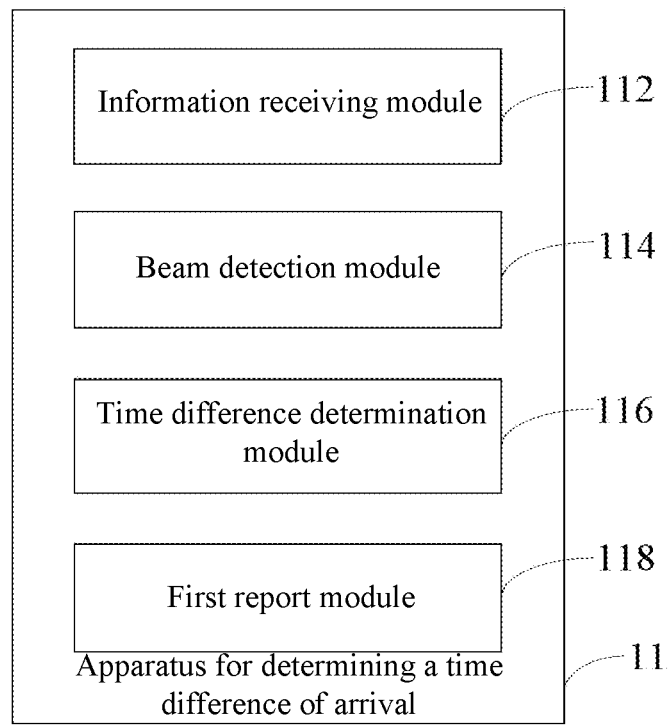
FIG. 12 is another schematic structure diagram of an apparatus for determining a time difference of arrival according to Embodiment 7 of the present disclosure.

It can be understood that the positioning server, when determining the positioning cell for the apparatus 11 for determining the time difference of arrival, may perform determination based on a coverage range of a serving cell of the apparatus 11 for determining the time difference of arrival and/or a coverage range of a connection beam of the apparatus 11 for determining the time difference of arrival. If the positioning server determines the connection beam only according to the coverage range of the serving cell of the apparatus 11 for determining the time difference of arrival, the positioning server needs to acquire the serving cell of the apparatus 11 for determining the time difference of arrival before the positioning server determines the positioning cell for the apparatus 11 for determining the time difference of arrival. It can be seen through the introduction of Embodiment 5 that the serving cell of the apparatus 11 for determining the time difference of arrival may be reported to the positioning server by the apparatus 11 for determining the time difference of arrival or may be reported by the serving cell. Therefore, in some examples of the present embodiment, as shown in FIG. 12, the apparatus 11 for determining the time difference of arrival further includes a first report module 118. The first report module 118 may be configured to transmit first beam determination information to the positioning server. The first beam determination information is used for indicating a connection beam used by the serving cell currently communicating with the apparatus 11 for determining the time difference of arrival to the positioning server. Before the information receiving module 112 receives the cell identity and the beam polling configuration information transmitted by the positioning server, the first report module 118 may need to report the serving cell of the apparatus 11 for determining the time difference of arrival to the positioning server. For example, the first report module 118 may transmit the first cell report information to the positioning server, and the cell identity of the serving cell of the apparatus 11 for determining the time difference of arrival may be carried in the first cell report information.

It can be understood that when the positioning server determines a positioning cell based on the coverage range of the serving cell, the positioning cell may be directly determined only according to the coverage range of the serving cell of the apparatus 11 for determining the time difference of arrival. For example, a neighbor cell having a coverage range overlapping with the coverage range of the serving cell is selected as a positioning cell, or other neighbor cells having a coverage range overlapping with the serving cell are also selected as positioning cells for realizing the positioning of the apparatus 11 for determining the time difference of arrival while selecting the serving cell as a positioning cell. Of course, in some examples of the present embodiment, there may be a problem that more cells overlap with the coverage range of the apparatus 11 for determining the time difference of arrival. In such a case, if the neighbor cells are all used as positioning cells for the positioning of the apparatus 11 for determining the time difference of arrival, there may be a problem that the number of the determined positioning cells is excessive, and the complexity is high when the apparatus 11 for determining the time difference of arrival performs signal measurement and time difference of arrival calculation. Therefore, in some examples of the present embodiment, the positioning server may also screen among these cells, such as only selecting neighbor cells that have an overlap rate with the coverage range of the serving cell not lower than a preset overlap threshold as positioning cells, etc.

In the above example, the positioning server directly determines the positioning cells according to the coverage range of the serving cell of the apparatus 11 for determining the time difference of arrival. In another scheme of the present embodiment, the positioning server determines the positioning cell for the terminal according to the connection beam of the apparatus 11 for determining the time difference of arrival. The coverage range of the connection beam is typically smaller than the coverage range of the serving cell, but the apparatus 11 for determining the time difference of arrival is certain to be within the coverage range of the connection beam because the terminal will communicate with the serving cell using the connection beam. Therefore, the neighbor cells for positioning determined by the positioning server according to the coverage range of the connection beam are more suitable for the terminal, and the accuracy is higher.

In one example of the present embodiment, the positioning server determines the positioning cells in combination with the coverage range of the serving cell and the coverage range of the connection beam. It can be understood that the coverage range of the connection beam is typically smaller than the coverage range of the serving cell, so that the positioning server may determine a part of candidate neighbor cells according to the coverage range of the serving cell, and then in combination with the coverage range of the connection beam, the positioning server may select a positioning cell from the candidate neighbor cells.

Therefore, in these examples, before the positioning server determines the positioning cell, the first report module 118 also needs to allow the positioning server to know which connection beam is used for the current communication between the apparatus 11 for determining the time difference of arrival and the serving cell. In some examples of the present embodiment, the connection beam between the terminal and the serving cell needs to be reported to the positioning server by the terminal, so in these examples, before receiving the cell identity of the neighbor cell for positioning and the beam polling configuration information transmitted by the positioning server, the first report module 118 also needs to transmit first beam determination information to the positioning server. In the first beam determination information, information indicating the connection beam may be carried. It can be understood that the connection beam may be actively reported by the first report module 118 to the positioning server or passively reported after receiving an information request transmitted by the positioning server.

In some examples of the present embodiment, the first report module 118 and the positioning server may communicate based on an LPP message and/or an NRPP message, so that the first report module 118 may transmit first cell report information and/or first beam determination information to the positioning server through the LPP message and/or the NRPP message. A cell identity and beam polling configuration information of a neighbor cell for positioning carried by the positioning server via the LPP message and/or the NRPP message may also be received. Of course, the first report module 118 communicating with the positioning server based on the LPP message and the NRPP message are only two examples, and other possible communication modes are not excluded in the present embodiment.

After the information receiving module 112 receives the cell identity and the beam polling configuration information transmitted by the positioning server, the beam detection module 114 may determine positioning cells, i.e. may determine PRS beams transmitted by cells that need to be detected. Meanwhile, according to the beam polling configuration information, the beam detection module 114 may determine information such as a number of beams for polling, a polling duration in a polling cycle, a polling count in a polling cycle, and a number of symbols contained in a single beam.

Therefore, according to the cell identity and the beam polling configuration information transmitted by the positioning server, the beam detection module 114 may detect the PRS beam transmitted by the positioning cell. In the present embodiment, in order to calculate a time difference of arrival of the PRS beams transmitted by the two positioning cells, the detection moment of the PRS is determined when the beam detection module 114 detects the PRS beam.

Since transmission moment information is carried in the PRS beam transmitted by each positioning cell, the transmission moment information carried in the PRS beam may indicate the transmission moment of the PRS beam. Therefore, when the beam detection module 114 detects a PRS beam, the transmission moment and the detection moment of the PRS beam can be determined. The same process is executed also for PRS beams transmitted by other positioning cells, so that after the beam detection module 114 detects the PRS beams transmitted by the two positioning cells, the time difference determination module 116 may calculate a time difference of arrival of the two PRS beams according to the respective transmission moments and detection moments of the two PRS beams.

The transmission moment information carried in the PRS beam may be at least one of: information indicating a sequence number of the first symbol transmitted by the PRS beam, index information of the PRS beam, and a transmission time stamp of the PRS beam. The transmission time stamp of the PRS beam refers to regional standard time carried in the PRS beam by the neighbor cell when transmitting the PRS beam, e.g., a:b:c':d", etc.

It can be understood that after the beam detection module 114 receives PRS beams transmitted by two positioning cells, the time difference determination module 116 may calculate the time difference of arrival of the PRS beams transmitted by the pair of positioning cells. For convenience of description, the two positioning cells in which the transmitted PRS beams are used to calculate the time difference of arrival are referred to as a "positioning cell pair". After the time difference determination module 116 calculates a time difference of arrival of PRS beams transmitted by multiple positioning cells, the apparatus 11 for determining the time difference of arrival may calculate the current position thereof based on the time difference of arrival. It can be understood that in order to enable the apparatus 11 for determining the time difference of arrival to calculate the position thereof, the positioning server also needs to inform the apparatus 11 for determining the time difference of arrival of the position of each positioning cell. Therefore, the apparatus 11 for determining the time difference of arrival may calculate the position of the terminal according to the known actual position of each positioning cell and the calculated time difference of arrival. Therefore, in these examples, the positioning server may transmit position information of the positioning cell to the apparatus 11 for determining the time difference of arrival when transmitting the cell identity and the beam polling configuration information of the positioning cell to the apparatus 11 for determining the time difference of arrival.

Of course, in some examples of the present embodiment, the process of determining the current position of the apparatus 11 for determining the time difference of arrival according to the time difference of arrival may be implemented by the positioning server, and in these examples, the positioning server does not need to transmit the position information of the selected positioning cell to the apparatus 11 for determining the time difference of arrival.

The apparatus 11 for determining the time difference of arrival provided by the present embodiment may be deployed on the terminal, the functions of the information receiving module 112, the beam detection module 114 and the first report module 118 may be jointly realized through a terminal processor and a communication unit, and the functions of the time difference determination module 116 may be directly realized through a processor of the terminal.

According to the apparatus for determining the time difference of arrival provided by the present embodiment, rules for positioning each positioning cell and transmitting PRS beams by each positioning cell according to the cell identity of the positioning cell obtained from the positioning server and the beam polling configuration information of the positioning cells may be determined, then the PRS beams may be detected according to the corresponding PRS beam transmission rules, and the time difference of arrival of the two PRS beams can be calculated according to the transmission moments and the detection moments of the PRS beams transmitted by the two positioning cells, thereby providing a basis for realizing downlink positioning in a millimeter wave scenario and solving the problem that downlink positioning cannot be accurately performed in the millimeter wave scenario.

Embodiment 8

The present embodiment provides a storage medium which may store one or more computer programs that can be read, compiled and executed by one or more processors. In the present embodiment, the storage medium may store at least one of a first time difference of arrival determination program, a second time difference of arrival determination program and a third time difference of arrival determination program. The first time difference of arrival determination program may be used for one or more processors to execute the operations of implementing the method for determining the time difference of arrival described in Embodiment 1 (i.e., the flow of a method for determining a time difference of arrival from the perspective of a positioning server). The second time difference of arrival determination program may be used for one or more processors to execute the operations of implementing the method for determining the time difference of arrival described in Embodiment 3 (i.e., the flow of a method for determining a time difference of arrival on a terminal). The third time difference of arrival determination program may be used for one or more processors to execute the operations of implementing the method for determining the time difference of arrival described in Embodiment 2 (i.e., the flow of a method for determining a time difference of arrival from the perspective of a cell).

Figure 13:
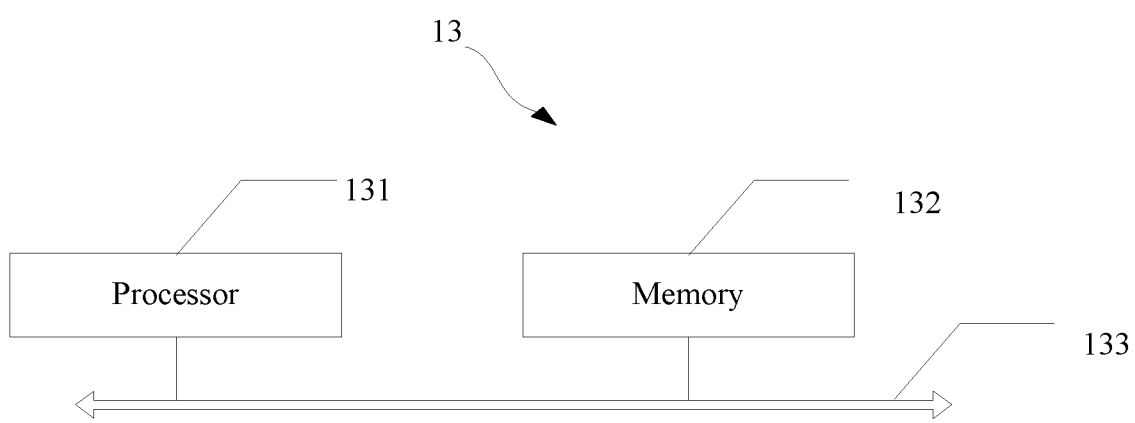
FIG. 13 is a schematic hardware structure diagram of a communication device according to Embodiment 8 of the present disclosure.

The present embodiment also provides a communication device. As shown in FIG. 13, the communication device 13 includes a processor 131, a memory 132 and a communication bus 133 for connecting the processor 131 and the memory 132. The memory 132 may be the foregoing storage medium in which at least one of the first time difference of arrival determination program, the second time difference of arrival determination program and the first time difference of arrival determination program is stored.

If the first time difference of arrival determination program is stored in the memory 132, the processor 131 may read the first time difference of arrival determination program, compile and execute the operations of implementing the method for determining the time difference of arrival from the perspective of a positioning server introduced in Embodiment 1. The communication device 13 may be a positioning server, and details of how the communication device 13 implements the method for determining the time difference of arrival may be found in the description of the foregoing embodiments and will not be described in detail herein.

In addition, if the communication device 13 is a device in a 5G communication system, an LMF network element may be provided thereon.

If the second time difference of arrival determination program is stored in the memory 132, the processor 131 may read the second time difference of arrival determination program, compile and execute the operations of implementing the method for determining the time difference of arrival on a terminal introduced in Embodiment 3. The communication device may be a terminal, and details of how the communication device 13 implements the method for determining the time difference of arrival in the embodiment may be found in the description of the foregoing embodiments and will not be described in detail herein.

If the third time difference of arrival determination program is stored in the memory 132, the processor 131 may read the third time difference of arrival determination program, compile and execute the operations of implementing the method for determining the time difference of arrival from the perspective of a cell introduced in Embodiment 2. The communication device may be a base station, and details of how the communication device 13 implements the method for determining the time difference of arrival in the embodiment may be found in the description of the foregoing embodiments and will not be described in detail herein.

The present embodiment also provides a communication system which includes a terminal, a positioning server and multiple transmission nodes. The terminal may be a communication device which may execute a second time difference of arrival determination program by a processor in FIG. 13 and realize the flow of the method for determining the time difference of arrival on a terminal. The positioning server may be a communication device which may execute a first time difference of arrival determination program by a processor in FIG. 13 and realize the flow of the method for determining the time difference of arrival from the perspective of a positioning server. The transmission node may be a communication device which may execute a third time difference of arrival determination program by a processor in FIG. 13 and realize the flow of the method for determining the time difference of arrival from the perspective of a cell. In some examples of the present embodiment, the transmission node may be a base station.

According to the communication system provided by the embodiments of the present disclosure, the base station may transmit PRSs by adopting beams, and therefore the problems that a millimeter wave attenuates seriously in the air and has insufficient diffraction ability are overcome in a manner of narrow beam transmission. The PRS born on the millimeter wave arrives at a terminal and is detected by the terminal, thereby achieving downlink positioning through the calculation of a time difference of arrival, and providing a solution for positioning in a millimeter wave application scenario.

It should be understood by those skilled in the art that the method for determining the time difference of arrival, the cell determination apparatus, the apparatus for determining the time difference of arrival, the beam transmission apparatus, the positioning server, the terminal, the transmission node, and the storage medium provided in the embodiments of the present disclosure may be applied not only to a 5G communication system, but also to any one communication system in the future.

It can be understood that the content in the above embodiments may be combined with each other to derive new embodiments not explicitly described.

It will be apparent to those skilled in the art that all or some of the operations in the methods disclosed above, and functional modules/units in systems and apparatuses may be implemented as software (which may be implemented in program code executable by a computing apparatus), firmware, hardware, and suitable combinations thereof. In a hardware implementation manner, the partitioning between functional modules/units mentioned in the above description does not necessarily correspond to the partitioning of physical components. For example, one physical component may have multiple functions, or one function or operation may be performed by several physical components in cooperation. Some or all of the physical components may be implemented as software executed by a processor, such as a central processor, a digital signal processor, or a microprocessor, or as hardware, or as an integrated circuit, such as an application specific integrated circuit. Such software may be distributed over a computer readable medium, which may include computer storage media (or non-transitory media) and communication media (or transitory media), and executed by a computing device, and in some cases, the operations shown or described may be performed in a different order than described herein. As is well known to those having ordinary skill in the art, the term computer storage media includes volatile and nonvolatile, removable and non-removable media implemented in any method or technology for storage of information (such as computer readable instructions, data structures, program modules or other data). The computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other media which may be used to store the desired information and accessed by a computer. In addition, as is well known to those having ordinary skill in the art, the communication media typically include computer readable instructions, data structures, program modules, or other data in a modulated data signal such as a carrier wave or other transport mechanism and may include any information delivery media. Therefore, the present disclosure is not limited to the combination of any specific hardware and software.

The above content is a further detailed description of the embodiments of the present disclosure in conjunction with the exemplary implementation manners. It is not intended that the exemplary implementations of the present disclosure be limited to these illustrations only. A number of simple derivations or replacements may be made by those having ordinary skill in the art without departing from the conception of the present disclosure, and all fall within the scope of protection of the present disclosure.

INDUSTRIAL APPLICABILITY

The present disclosure is applied to the field of positioning, and is used for overcoming the problems that a millimeter wave attenuates seriously in the air and has insufficient diffraction ability. The PRS born on the millimeter wave arrives at a terminal and is detected by the terminal, thereby achieving downlink positioning through the calculation of a time difference of arrival, and providing a solution for positioning in a millimeter wave application scenario.

What is claimed is:

1. A method performed by a positioning server, comprising:
   determining neighbor cells for positioning for a terminal; and
   transmitting cell identities and beam polling configuration information of the neighbor cells to the terminal, wherein the cell identities and the beam polling configuration information are used for the terminal to detect Positioning Reference Signal (PRS) beams transmitted by the neighbor cells and to determine, according to a detection result, a time difference of arrival of PRS beams transmitted by one neighbor cell and another neighbor cell.

2. The method performed by the positioning server according to claim 1, wherein the beam polling configuration information comprises: the number of beams participating in polling, a polling duration in a polling cycle, a polling count in the polling cycle, the number of symbols contained in a single beam, and a beam index of a PRS beam to be transmitted.

3. The method performed by the positioning server according to claim 1, wherein determining the neighbor cells for positioning for the terminal comprises:
   determining, for the terminal, the neighbor cells for positioning based on at least one of: a coverage range of a serving cell of the terminal, and a coverage range of a connection beam, wherein the connection beam is a beam used by the terminal to communicate with the serving cell.

4. The method performed by the positioning server according to claim 3, wherein determining, for the terminal, the neighbor cells for positioning based on the coverage range of the serving cell of the terminal and the coverage range of the connection beam comprises:
   determining candidate neighbor cells according to the coverage range of the serving cell; and
   determining, for the terminal, the neighbor cells for positioning from the candidate neighbor cells according to the coverage range of the connection beam.

5. The method performed by the positioning server according to claim 3, wherein before determining, for the terminal, the neighbor cells for positioning based on the coverage range of the serving cell of the terminal and the coverage range of the connection beam, or before determining, for the terminal, the neighbor cells for positioning based on the coverage range of the connection beam of the terminal, the method further comprises determining the connection beam of the terminal in at least one of the following manners:
   a first manner of receiving first beam determination information transmitted by the terminal, and determining the connection beam used for current communication between the terminal and the serving cell according to the first beam determination information;
   a second manner of receiving second beam determination information transmitted by the serving cell, and determining the connection beam used for current communication between the terminal and the serving cell according to the second beam determination information; and
   a third manner of receiving third beam determination information transmitted by an Access Mobility Function (AMF) network element, and determining the connection beam used for current communication between the terminal and the serving cell according to the third beam determination information.

6. The method performed by the positioning server according to claim 5, wherein receiving the first beam determination information transmitted by the terminal comprises: receiving the first beam determination information transmitted by the terminal through at least one of: a Long Term Evolution (LTE) Positioning Protocol (LPP) message, and a New Radio (NR) Positioning Protocol (NRPP) message.

7. The method performed by the positioning server according to claim 5, wherein receiving the second beam determination information transmitted by the serving cell comprises: receiving the second beam determination information transmitted by the serving cell through an NR Positioning Protocol Annex (NRPPa) message.

8. The method performed by the positioning server according to claim 5, wherein receiving the third beam determination information transmitted by the AMF network element comprises: receiving the third beam determination information transmitted by the AMF through a number location service (NLs) interface.

9. A communication device, comprising a processor, a memory and a communication bus, wherein
   the communication bus is configured to implement a connection and communication between the processor and the memory; and
   the processor is configured to execute a first time difference of arrival determination program stored in the memory to implement the operations of the method for determining the time difference of arrival according to claim 1.

10. A method performed by a terminal, comprising:
    receiving cell identities and beam polling configuration information of positioning cells, which are transmitted by a positioning server;
    detecting, according to the cell identities and the beam polling configuration information, Positioning Reference Signal (PRS) beams transmitted by the positioning cells, and determining detection moments of the PRS beams, wherein each PRS beam carries transmission moment information indicating a transmission moment of the PRS beam; and determining, according to the transmission moments and the detection moments of the PRS beams transmitted by the two positioning cells, a time difference of arrival of the PRS beams transmitted by two positioning cells.

11. The method performed by the terminal according to claim 10, wherein the transmission moment information carried in each PRS beam comprises at least one of: information indicating a sequence number of the first symbol transmitted by the PRS beam, index information of the PRS beam, and a transmission time stamp of the PRS beam;

or, the cell identities of the positioning cells are determined by the positioning server according to a coverage range of a connection beam currently used by a terminal to communicate with a serving cell.

12. The method performed by the terminal according to claim 11, wherein before receiving the cell identities and the beam polling configuration information of the positioning cells, which are transmitted by the positioning server, the method further comprises:

transmitting first beam determination information to the positioning server, wherein the first beam determination information is used for indicating the connection beam of the terminal to the positioning server.

13. The method performed by the terminal according to claim 12, wherein transmitting the first beam determination information to the positioning server comprises: transmitting the first beam determination information to the positioning server through at least one of: a Long Term Evolution (LTE) Positioning Protocol (LPP) message, and a New Radio (NR) Positioning Protocol (NRPP) message.

14. A communication device, comprising a processor, a memory and a communication bus, wherein the communication bus is configured to implement a connection and communication between the processor and the memory; and the processor is configured to execute a first time difference of arrival determination program stored in the memory to implement the operations of the method for determining the time difference of arrival according to claim 10.

15. A method performed by a transmission node, comprising:

transmitting beam polling configuration information of a cell to a positioning server, wherein the beam polling configuration information is used for detecting a Positioning Reference Signal (PRS) beam by a terminal to be positioned after receiving the beam polling configuration information transmitted by the positioning server; and transmitting the PRS beam according to the beam polling configuration information, wherein the PRS beam carries transmission moment information indicating a transmission moment of the PRS beam, and the transmission moment is used for the terminal to determine, by combining a detection moment of the PRS beam, a time difference of arrival of PRS beams transmitted by the cell and another positioning cell.

16. The method performed by the transmission node according to claim 15, wherein the transmission moment information carried in the PRS beam comprises at least one of: information indicating a sequence number of the first symbol transmitted by the PRS beam, index information of the PRS beam, and a transmission time stamp of the PRS beam.

17. The method performed by the transmission node according to claim 15, wherein the beam polling configuration information comprises: the number of beams participating in polling, a polling duration in a polling cycle, a polling count in the polling cycle, the number of symbols contained in a single beam, and a beam index of a PRS beam to be transmitted.

18. The method performed by the transmission node according to claim 15, wherein in a case where the cell is a serving cell of the terminal, the method for determining the time difference of arrival further comprises:

transmitting second beam determination information to the positioning server, wherein the second beam determination information is used for indicating a connection beam currently used by the cell for communicating with the terminal to the positioning server.

19. The method performed by the transmission node according to claim 18, wherein transmitting the second beam determination information to the positioning server comprises: transmitting the second beam determination information to the positioning server through an NR Positioning Protocol Annex (NRPPa) message.

20. A communication device, comprising a processor, a memory and a communication bus, wherein the communication bus is configured to implement a connection and communication between the processor and the memory; and the processor is configured to execute a first time difference of arrival determination program stored in the memory to implement the operations of the method for determining the time difference of arrival according to claim 15.

* * * * *